(12) United States Patent
Wu et al.

(10) Patent No.: US 11,817,979 B2
(45) Date of Patent: Nov. 14, 2023

(54) METHOD AND DEVICE IN NODES USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/691,053

(22) Filed: Mar. 9, 2022

(65) Prior Publication Data

US 2022/0200831 A1 Jun. 23, 2022

Related U.S. Application Data

(63) Continuation of application No. PCT/CN2020/112798, filed on Sep. 1, 2020.

(30) Foreign Application Priority Data

Sep. 18, 2019 (CN) .......................... 201910882776.3

(51) Int. Cl.
*H04L 27/26* (2006.01)
*H04L 5/00* (2006.01)

(52) U.S. Cl.
CPC ........ *H04L 27/2602* (2013.01); *H04L 5/0007* (2013.01); *H04L 5/0048* (2013.01); *H04L 5/0053* (2013.01)

(58) Field of Classification Search
CPC . H04W 72/23; H04W 72/0446; H04W 48/16; H04W 52/365; H04W 74/0833;
(Continued)

(56) References Cited

U.S. PATENT DOCUMENTS

2015/0358998 A1\* 12/2015 Golitschek Edler Von Elbwart ............ H04W 72/0446 370/280
2022/0279547 A1\* 9/2022 Falahati ................ H04L 1/1812
(Continued)

FOREIGN PATENT DOCUMENTS

CN 104272608 A 1/2015
CN 105191196 A 12/2015
(Continued)

OTHER PUBLICATIONS

ISR received in application No. PCT/CN2020/112798 dated Dec. 1, 2020.
(Continued)

*Primary Examiner* — Eva Y Puente

(57) ABSTRACT

The present disclosure provides a method and device in nodes used for wireless communication. A first node receives a first signaling, the first signaling is used to indicate a first symbol set; and then operates a first radio signal in only a first symbol group in the first symbol set. The first signaling is used to indicate scheduling information of the first radio signal; any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set.

20 Claims, 6 Drawing Sheets

(58) Field of Classification Search
CPC .. H04W 52/146; H04L 5/1469; H04L 1/1812; H04L 1/1887; H04L 5/14; H04L 1/0061; H04L 1/1861; H04L 1/0041; H04B 7/2612; H04B 7/2621; H04B 7/2656; H04B 7/0456; H04B 7/06; H04B 7/0617; H04B 7/2643
USPC .......................................................... 375/260
See application file for complete search history.

(56) References Cited

U.S. PATENT DOCUMENTS

| | | | | |
|---|---|---|---|---|
| 2022/0287093 | A1* | 9/2022 | Iyer | H04B 7/0695 |
| 2022/0295589 | A1* | 9/2022 | Tsai | H04B 17/309 |

FOREIGN PATENT DOCUMENTS

| | | | |
|---|---|---|---|
| CN | 105846963 | A | 8/2016 |
| CN | 106130698 | A | 11/2016 |
| CN | 108512637 | A | 9/2018 |
| CN | 108811120 | A | 11/2018 |
| CN | 109983819 | A | 7/2019 |
| CN | 109997330 | A | 7/2019 |
| CN | 110166210 | A | 8/2019 |
| CN | 110169178 | A | 8/2019 |
| WO | 2012086932 | A1 | 6/2012 |
| WO | 2019028751 | A1 | 2/2019 |
| WO | 2019066705 | A1 | 4/2019 |

OTHER PUBLICATIONS

CN201910882776.3 Notification to Grant Patent Right for Invention dated Dec. 8, 2021.
CN201910882776.3 Supplemental Search Report dated Nov. 15, 2021.
CN201910882776.3 First Office Action dated Aug. 6, 2021.
CN201910882776.3 First Search Report dated Jul. 28, 2021.
Ericsson "Configuration of Flexible TDD DL UL Patterns" 3GPP TSG RAN WG1 Meeting #96bis R1-1904139 Apr. 12, 2019.
NTI Docomo Inc "Maintenance for DL/UL data scheduling and HARQ procedure" 3GPP TSG RAN WG1 Meeting #94bis R1-1811375 Sep. 29, 2018.
Spreadtrum Communications"Consideration on enhanced UL grant-free transmissions" 3GPP TSG RAN WG1 Meeting #94 R1-1808809 Aug. 24, 2018.
NTT Docomo. Inc. "Consideration on NR TDD configuration" 3GPP TSG-RAN WG4 Meeting #86-bis R4-1804978, Apr. 20, 2018.
Huawei et al. "TDD configurations for MSR considerations" 3GPP TSG RAN WG4 Meeting #88 R4-1810162, Aug. 24, 2018 (Aug. 24, 2018).

* cited by examiner (a) when type of first signaling comprising first type (b) when type of first signaling comprising second type Only when first signaling is DCI signaling used for uplink grant (a) when type of first signaling comprising first type (b) when type of first signaling comprising second type (a) when type of first signaling comprising first type (b) when type of first signaling comprising second type No matter whether type of first signaling comprises first type or second type No matter whether type of first signaling comprises first type or second type

METHOD AND DEVICE IN NODES USED FOR WIRELESS COMMUNICATION

CROSS REFERENCE TO RELATED APPLICATIONS

This application is the continuation of International Patent Application No. PCT/CN2020/112798, filed on Sep. 1, 2020, which claims the priority benefit of Chinese Patent Application No. 201910882776.3, filed on Sep. 18, 2019, the full disclosure of which is incorporated herein by reference.

BACKGROUND

Technical Field

The present disclosure relates to transmission methods and devices in wireless communication systems, and in particular to a transmission method and device of a radio signal in a wireless communication system supporting cellular networks.

Related Art

In 5G system, in order to support more demanding Ultra Reliable and Low Latency Communication (URLLC) traffic, for example, with higher reliability (e.g., a target BLER of 10^-6) or with lower latency (e.g., 0.5-1 ms), a study item (SI) of URLLC advancement in New Radio (NR) Release 16 was approved at 3rd Generation Partner Project (3GPP) Radio Access Network (RAN) #80 Plenary. One focus of the study is how to realize lower transmission latency and higher transmission reliability of a Physical Uplink Shared CHannel (PUSCH)/Physical Downlink Shared CHannel (PDSCH). In order to support demands of higher reliability and lower latency of URLLC traffic, 3GPP NR Rel-16 system has agreed to adopt a transmission scheme based on nominal repetition in uplink transmissions. When a nominal repetition crosses a boundary of a sot or a Downlink/Uplink (DL/UL) switching point, the nominal repetition is divided into two actual repetitions.

SUMMARY

Flexible symbols and dynamic UL/DL configuration have been introduced into 3GPP NR system. Considering the influence of flexible symbols and dynamic UL/DL configuration, how to design a repetition scheme is a key problem to be solved.

To address the above problem, the present disclosure provides a solution. In the description of the above problem, a repetition is illustrated as an example; the present disclosure is also applicable to a single (i.e., non-repetitive) transmission scenario to achieve similar technical effects in repetition. Besides, a unified solution for different scenarios (including but not limited to repetition scenarios and single transmission) can also help reduce hardware complexity and cost. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling, the first signaling being used to indicate a first symbol set; and operating a first radio signal in only a first symbol group in the first symbol set;

herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

In one embodiment, a problem to be solved in the present disclosure is: considering the influence of flexible symbols and dynamic UL/DL configuration, how to design a repetition scheme is a key problem to be solved.

In one embodiment, a problem to be solved in the present disclosure is: considering the influence of flexible symbols and dynamic UL/DL configuration, the design of UL/DL configuration or the configuration of multicarrier symbol types referred to in the repetition scheme is a key problem to be solved.

In one embodiment, the above method is essential in that a first radio signal is a PUSCH, a first signaling is a DCI signaling scheduling a PUSCH, a first symbol group is multicarrier symbols actually occupied by the PUSCH among multicarrier symbols (i.e., a first symbol set) indicated by a DCI signaling, a target TDD configuration is used to determine multicarrier symbols actually occupied by a transmission of the PUSCH, and the DCI signaling implicitly indicates the target TDD configuration. The advantage of adopting the above method is that different TDD configurations can be adopted for the transmission of different traffic types to meet the requirements of different traffic types for reliability and delay.

In one embodiment, the above method is essential in that a first radio signal is a PDSCH, a first signaling is a DCI signaling scheduling a PDSCH, a first symbol group is multicarrier symbols actually occupied by the PDSCH among multicarrier symbols (i.e., a first symbol set) indicated by a DCI signaling, a target TDD configuration is used to determine multicarrier symbols actually occupied by a transmission of the PDSCH, and the DCI signaling implicitly indicates the target TDD configuration. The advantage of adopting the above method is that different TDD configurations can be adopted for the transmission of different traffic types to meet the requirements of different traffic types for reliability and delay.

In one embodiment, the above method is essential in that a first radio signal is a PUSCH/PDSCH, a first signaling is a DCI signaling scheduling the PUSCH/PDSCH, a first symbol group is multicarrier symbols actually occupied by the PUSCH/PDSCH among multicarrier symbols (i.e., a first symbol set) indicated by a DCI signaling, a target TDD configuration is used to determine multicarrier symbols actually occupied by a PUSCH/PDSCH transmission, and the DCI signaling implicitly indicates the target TDD configuration. The advantage of adopting the above method is that different TDD configurations can be adopted for UL/DL transmission to meet different requirements of UL/DL transmission for reliability and delay.

According to one aspect of the present disclosure, the above method is characterized in comprising:

receiving first information;

herein, the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

In one embodiment, the above method is essential in that a target TDD configuration is semi-statically configured, a first type is an eMBB traffic, and a second type is a URLLC traffic.

According to one aspect of the present disclosure, the above method is characterized in that when the type of the first signaling comprises the second type, the first radio signal comprises K sub-signals, and each of the K sub-signals carries a first bit block; K is a positive integer greater than 1, and the first bit block comprises at least one bit.

According to one aspect of the present disclosure, the above method is characterized in that only when the first signaling is a DCI signaling used for uplink grant, the first signaling implicitly indicates the target TDD configuration.

According to one aspect of the present disclosure, the above method is characterized in comprising:

receiving a second signaling, the second signaling being used to indicate a first slot format;

herein, the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set, or the first slot format and the target TDD configuration are used together to determine the first symbol group out of the first symbol set.

According to one aspect of the present disclosure, the above method is characterized in comprising:

receiving third information, the third information being used to indicate a second symbol set; and monitoring the first signaling in only a second symbol group in the second symbol set;

herein, no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set.

In one embodiment, the above method is essential in that a first symbol group is multicarrier symbols monitoring a PDCCH, a TDD configuration used to determine a multicarrier symbol monitoring a PDCCH is a first TDD configuration, which is unrelated to a type of a first signaling.

According to one aspect of the present disclosure, the above method is characterized in comprising:

judging whether a second bit block is transmitted in a first time-frequency resource group; if yes, transmitting the second bit block in the first time-frequency resource group; if no, dropping transmitting the second bit block in the first time-frequency resource group;

herein, the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is transmitted in a first time-frequency resource group.

In one embodiment, the above method is essential in that a first time-frequency resource group is PUCCH resources transmitting a HARQ-ACK, a TDD configuration used to determine whether the PUCCH resources can transmit UCI is a first TDD configuration, which is unrelated to a first signaling.

The present disclosure provides a method in a second node for wireless communications, comprising:

transmitting a first signaling, the first signaling is used to indicate a first symbol set; and executing a first radio signal in only a first symbol group in the first symbol set;

herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

According to one aspect of the present disclosure, the above method is characterized in comprising:

transmitting first information;

herein, the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

According to one aspect of the present disclosure, the above method is characterized in that when the type of the first signaling comprises the second type, the first radio signal comprises K sub-signals, and each of the K subsignals carries a first bit block; K is a positive integer greater than 1, and the first bit block comprises at least one bit.

According to one aspect of the present disclosure, the above method is characterized in that only when the first signaling is a DCI signaling used for uplink grant, the first signaling implicitly indicates the target TDD configuration.

According to one aspect of the present disclosure, the above method is characterized in comprising:

transmitting a second signaling, the second signaling being used to indicate a first slot format;

herein, the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set, or the first slot format and the target TDD configuration are used together to determine the first symbol group out of the first symbol set.

According to one aspect of the present disclosure, the above method is characterized in comprising:

transmitting third information, the third information being used to determine a second symbol set;

herein, the first signaling is transmitted in only a second symbol group in the second symbol set; no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set.

According to one aspect of the present disclosure, the above method is characterized in comprising:

judging whether a second bit block is received in a first time-frequency resource group; if yes, receiving the second bit block in the first time-frequency resource group; if no, dropping receiving the second bit block in the first time-frequency resource group;

herein, the executing action is transmitting; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is received in a first time-frequency resource group.

The present disclosure provides a first node for wireless communications, comprising:

a first receiver, receiving a first signaling, the first signaling being used to indicate a first symbol set; and a first transceiver, operating a first radio signal in only a first symbol group in the first symbol set;

herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

The present disclosure provides a second node for wireless communications, comprising:

a second transmitter, transmitting a first signaling, the first signaling being used to indicate a first symbol set; and a second transceiver, executing a first radio signal in only a first symbol group in the first symbol set;

herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

In one embodiment, the method in the present disclosure is advantageous in the following aspects:

the present disclosure, considering the influence of flexible symbols and dynamic UL/DL configuration, proposes a repetition scheme.

the present disclosure, taking into account the influence of flexible symbols and dynamic UL/DL configuration, proposes a scheme for the design of UL/DL configuration or the configuration of multicarrier symbol types referred to in the repetition scheme.

in the method proposed in the present disclosure, different TDD configurations can be adopted for the transmission of different traffic types to meet the requirements of different traffic types for reliability and delay.

in the method proposed in the present disclosure, different TDD configurations can be adopted for UL/DL transmission to meet different requirements of UL/DL transmission for reliability and delay.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
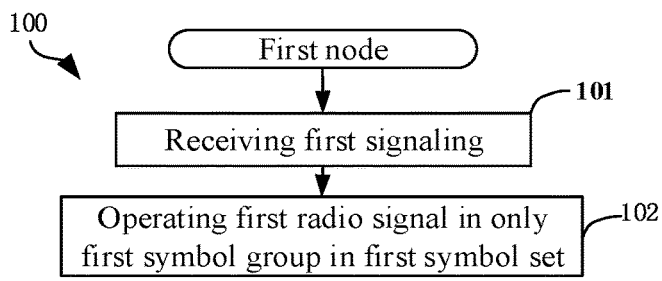
FIG. 1 illustrates a flowchart of a first signaling and a first radio signal according to one embodiment of the present disclosure.

Embodiment 1 illustrates a flowchart of a first signaling and a first radio signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives a first signaling in step 101, and the first signaling is used to indicate a first symbol set; in step 102 operates a first radio signal in only a first symbol group in the first symbol set; herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

In one embodiment, the first signaling is dynamically configured.

In one embodiment, the first signaling is a physical-layer signaling.

In one embodiment, the first signaling is a Downlink Control Information (DCI) signaling.

In one embodiment, the first signaling is a DCI signaling for UpLink Grant, and the operating action is transmitting.

In one embodiment, the first signaling is a DCI signaling for DownLink Grant, and the operating action is receiving.

In one embodiment, the first signaling is transmitted on a downlink physical layer control channel (i.e., a downlink channel that is only capable of carrying a physical layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the operating action is receiving, the first signaling is DCI format 1_0, and the specific meaning of the DCI format 1_0 can be found in 3GPP TS38.212, section 7.3.1.2.

In one embodiment, the operating action is receiving, the first signaling is DCI format 1_1, and the specific meaning of the DCI format 1_1 can be found in 3GPP TS38.212, section 7.3.1.2.

In one embodiment, the operating action is transmitting, the first signaling is DCI format 0_0, and the specific meaning of the DCI format 0_0 can be found in 3GPP TS38.212, section 7.3.1.1.

In one embodiment, the operating action is transmitting, the first signaling is DCI format 0_1, and the specific meaning of the DCI format 0_1 can be found in 3GPP TS38.212, section 7.3.1.1.

In one embodiment, a number of multicarrier symbols comprised in the first symbol group is less than a number of multicarrier symbols comprised in the first symbol set.

In one embodiment, any multicarrier symbol in the first symbol group is a multicarrier symbol in the first symbol set.

In one embodiment, the first symbol group is the first symbol set, and a number of multicarrier symbols comprised in the first symbol group is equal to a number of multicarrier symbols comprised in the first symbol set.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multi-carrier symbol is a Filter Bank Multi-Carrier (FBMC) symbol.

In one embodiment, the multicarrier symbol comprises a Cyclic Prefix (CP).

In one embodiment, the first signaling explicitly indicates a first symbol set.

In one embodiment, the first signaling implicitly indicates a first symbol set.

In one embodiment, the first signaling comprises a first field, and the first field comprised in the first signaling is used to indicate a first symbol set.

In one subembodiment of the above embodiment, the first field comprised in the first signaling explicitly indicates a first symbol set.

In one subembodiment of the above embodiment, the first field comprised in the first signaling comprises at least one bit.

In one subembodiment of the above embodiment, the first field comprised in the first signaling implicitly indicates a first symbol set.

In one subembodiment of the above embodiment, the first field comprised in the first signaling is a Time domain resource assignment field, and the specific meaning of the Time domain resource assignment field can be found in 3GPP TS38.212, section 7.3.1.

In one embodiment, the operating action is transmitting.

In one embodiment, the operating action is receiving.

In one embodiment, the operating action is transmitting, and the first radio signal comprises uplink data.

In one embodiment, the operating action is transmitting, and the first radio signal comprises a transmission of an uplink physical-layer data channel.

In one embodiment, the operating action is receiving, and the first radio signal comprises downlink data.

In one embodiment, the operating action is receiving, and the first radio signal comprises a transmission of a downlink physical-layer data channel.

In one embodiment, the operating action is transmitting, the first radio signal is transmitted on an uplink physical layer data channel (i.e., an uplink channel capable of carrying physical layer data).

In one embodiment, the operating action is receiving, the first radio signal is transmitted on a downlink physical layer data channel (i.e., a downlink channel capable of bearing physical layer data).

In one embodiment, the UL physical-layer data channel is a Physical Uplink Shared CHannel (PUSCH).

In one subembodiment, the UL physical-layer data channel is a short PUSCH (sPUSCH).

In one embodiment, the UL physical-layer data channel is a Narrow Band PUSCH (NPUSCH).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NPDSCH).

In one embodiment, the first radio signal carries a first bit block, and the first bit block comprises at least one bit.

In one subembodiment of the above embodiment, the first bit block comprises a transport block (TB).

In one subembodiment of the above embodiment, the first bit block comprises at least one TB.

In one embodiment, only the first symbol group in the first symbol set is used to operate the first bit block.

In one embodiment, there exists a multicarrier symbol in the first symbol set not belonging to the first symbol group, and any multicarrier symbol other than the first symbol group in the first symbol set is not used to operate the first bit block.

In one embodiment, the scheduling information of the first radio signal comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), number of repetitions, time-domain resources occupied by a first repetition, a transmitting antenna port, a corresponding multi-antenna related transmission or a corresponding multi-antenna related reception.

In one subembodiment of the above embodiment, the occupied time-domain resources comprised in the scheduling information of the first radio signal comprise the first symbol set.

In one subembodiment of the above embodiment, the occupied frequency-domain resources comprised in the scheduling information of the first radio signal comprise frequency-domain resources occupied by the first radio signal.

In one subembodiment of the above embodiment, the scheduling information of the DMRS comprised in the scheduling information of the first radio signal comprises at least one of a Reference Signal (RS) sequence, a mapping mode, a DMRS type, occupied time-domain resources, occupied frequency-domain resources, occupied code-domain resources, a cyclic shift or an Orthogonal Cover Code (OCC).

In one embodiment, the multi-antenna related reception refers to Spatial Rx parameters.

In one embodiment, the multi-antenna related reception refers to a receiving beam.

In one embodiment, the multi-antenna associated reception refers to a receiving beamforming matrix.

In one embodiment, the multi-antenna associated reception refers to a receiving analog beamforming matrix.

In one embodiment, the multi-antenna associated reception refers to a receiving analog beamforming vector.

In one embodiment, the multi-antenna associated reception refers to a receiving beamforming vector.

In one embodiment, the multi-antenna associated reception refers to receiving spatial filtering.

In one embodiment, the multi-antenna associated transmission refers to Spatial Tx parameters.

In one embodiment, the multi-antenna associated transmission refers to a transmitting beam.

In one embodiment, the multi-antenna associated transmission refers to a transmitting beamforming matrix.

In one embodiment, the multi-antenna associated transmission refers to a transmitting analog beamforming matrix.

In one embodiment, the multi-antenna associated transmission refers to a transmitting analog beamforming vector.

In one embodiment, the multi-antenna associated transmission refers to a transmitting beamforming vector.

In one embodiment, the multi-antenna associated transmission refers to transmitting spatial filtering.

In one embodiment, the Spatial Tx parameter comprises one or more of a transmitting antenna port, a transmitting antenna port set, a transmitting beam, a transmitting analog beamforming matrix, a transmitting analog beamforming vector, a transmitting beamforming matrix, a transmitting beamforming vector and transmitting spatial filtering.

In one embodiment, the Spatial Rx parameter comprises one or more of a receiving beam, a receiving analog beamforming matrix, a receiving analog beamforming vector, a receiving beamforming matrix, a receiving beamforming vector and receiving spatial filtering.

In one embodiment, the target TDD configuration is a Time Division Duplex (TDD) configuration.

In one embodiment, the target TDD configuration is slot format.

In one embodiment, the TDD configuration is semi-statically configured.

In one embodiment, the target TDD configuration is a configuration for a multicarrier symbol type in TDD system.

In one embodiment, types of the multicarrier symbol comprise UL symbol, DL symbol and Flexible symbol.

In one embodiment, the target TDD configuration is used to indicate a type of each multicarrier symbol in the first symbol set.

In one embodiment, the target TDD configuration explicitly indicates a type of each multicarrier symbol in the first symbol set.

In one embodiment, the target TDD configuration implicitly indicates a type of each multicarrier symbol in the first symbol set.

In one embodiment, the target TDD configuration indicates a type of each multicarrier symbol within a slot configuration period, and a type of each multicarrier symbol in the first symbol set is determined according to a length of the slot configuration period and a type of each multicarrier symbol within a slot configuration period.

In one subembodiment of the above embodiment, the slot configuration period comprises at least one slot.

In one subembodiment of the above embodiment, the slot configuration period comprises at least one symbol.

In one subembodiment of the above embodiment, a first multicarrier symbol and a second multicarrier symbol are respectively a multicarrier symbol with a same position in two slot configuration periods, and types of the first multicarrier symbol and the second multicarrier symbol are the same.

In one subembodiment of the above embodiment, a first multicarrier symbol and a second multicarrier symbol are respectively an i-th multicarrier symbol within two slot configuration periods, types of the first multicarrier symbol and the second multicarrier symbol are the same, i being a positive integer not greater than a number of multicarrier symbol(s) comprised in the slot configuration period.

In one embodiment, the target TDD configuration indicates a type of each multicarrier symbol within a slot configuration period, and a type of each multicarrier symbol in each slot is determined according to a length of the slot configuration period and a type of each multicarrier symbol within a slot configuration period.

In one embodiment, the target TDD configuration indicates a type of each multicarrier symbol within a slot configuration period, and a type of each multicarrier symbol in the first symbol set is determined according to a type of each multicarrier symbol within the slot configuration period and a position of the first symbol set within the slot configuration period.

In one subembodiment of the above embodiment, a given multicarrier symbol is any multicarrier symbol in the first symbol set, the given multicarrier symbol is a j-th multicarrier symbol in the slot configuration period, and a type of the given multicarrier symbol is a type of the j-th multicarrier symbol in the slot configuration period, j being a positive integer not greater than a number of multicarrier symbol(s) comprised in the slot configuration period.

In one embodiment, the phrase of the first signaling implicitly indicating the target TDD configuration comprises: the target TDD configuration is one of M TDD configurations, the first signaling implicitly indicates the target TDD configuration out of the M TDD configurations, M being a positive integer greater than 1.

In one embodiment, the phrase of the first signaling implicitly indicating the target TDD configuration comprises: the target TDD configuration is a first TDD configuration or a second TDD configuration, and the first signaling implicitly indicates whether the target TDD configuration is the first TDD configuration or the second TDD configuration.

In one embodiment, the phrase of the first signaling implicitly indicating the target TDD configuration comprises: any bit in the first signaling does not explicitly indicate the target TDD configuration.

In one embodiment, the phrase of the first signaling implicitly indicating the target TDD configuration comprises: the target TDD configuration is associated with a type of the first signaling.

In one embodiment, the phrase of the first signaling implicitly indicating the target TDD configuration comprises: the target TDD configuration is associated with a DCI format corresponding to the first signaling.

In one embodiment, the phrase of the first signaling implicitly indicating the target TDD configuration comprises: the target TDD configuration is associated with a Radio Network Temporary Identifier (RNTI) corresponding to the first signaling.

In one embodiment, the phrase of the first signaling implicitly indicating the target TDD configuration comprises: the target TDD configuration is associated with a payload size corresponding to the first signaling.

In one embodiment, the payload size is a number of information bits.

In one embodiment, the payload size is a number of information bits comprising padding bits.

In one embodiment, the phrase of the first signaling implicitly indicating the target TDD configuration comprises: the target TDD configuration is associated with a priority corresponding to the first signaling.

In one embodiment, the phrase of the first signaling implicitly indicating the target TDD configuration comprises: the target TDD configuration is associated with a traffic type corresponding to the first signaling.

In one embodiment, the phrase of the first signaling implicitly indicating the target TDD configuration comprises: the target TDD configuration is associated with a grant type corresponding to the first signaling, and the grant type is an uplink grant or a downlink grant.

In one embodiment, the phrase of the first signaling implicitly indicating the target TDD configuration comprises: the target TDD configuration is associated with a transmission scheme of the first radio signal scheduled by the first signaling.

In one embodiment, the phrase of the first signaling implicitly indicating the target TDD configuration comprises: the first signaling comprises a first field set, the first field comprised in the first signaling implicitly indicates the target TDD configuration, the first field set comprised in the first signaling comprises at least one field, and the field comprises at least one bit.

In one subembodiment of the above embodiment, the first field set comprised in the first signal comprises a field.

In one subembodiment of the above embodiment, the first field set comprised in the first signal comprises a plurality of fields.

In one subembodiment of the above embodiment, the first field set comprised in the first signal indicates a DCI format.

In one subembodiment of the above embodiment, the first field set comprised in the first signal indicates an RNTI.

In one subembodiment of the above embodiment, the first field set comprised in the first signal indicates an RNTI.

In one subembodiment of the above embodiment, the first field set comprised in the first signaling is used to determine a payload size.

In one subembodiment of the above embodiment, the first field set comprised in the first signaling explicitly indicates a payload size.

In one subembodiment of the above embodiment, the first field set comprised in the first signaling implicitly indicates a payload size.

In one subembodiment of the above embodiment, the first field set comprised in the first signaling is used to determine a priority.

In one subembodiment of the above embodiment, the first field set comprised in the first signaling explicitly indicates a priority.

In one subembodiment of the above embodiment, the first field set comprised in the first signaling implicitly indicates a priority.

In one subembodiment of the above embodiment, the first field set comprised in the first signaling is used to determine a traffic type.

In one subembodiment of the above embodiment, the first field set comprised in the first signaling explicitly indicates a traffic type.

In one subembodiment of the above embodiment, the first field set comprised in the first signaling implicitly indicates a traffic type.

In one subembodiment of the above embodiment, the first field comprised in the first signaling indicates a grant type, and the grant type is an uplink grant or a downlink grant.

In one subembodiment of the above embodiment, the first field set comprised in the first signaling is used to determine a transmission scheme of the first radio signal.

In one subembodiment of the above embodiment, the first field set comprised in the first signaling explicitly indicates a transmission scheme of the first radio signal.

In one subembodiment of the above embodiment, the first field set comprised in the first signaling implicitly indicates a transmission scheme of the first radio signal.

In one embodiment, a type of the first signaling comprises a DCI format.

In one embodiment, a type of the first signaling comprises an RNTI.

In one embodiment, a type of the first signaling comprises a payload size.

In one embodiment, a type of the first signaling comprises a priority.

In one embodiment, a type of the first signaling comprises a traffic type.

In one embodiment, a type of the first signaling comprises a grant type, and the grant type is an uplink grant or a downlink grant.

In one embodiment, a type of the first signaling comprises a transmission scheme of the first radio signal.

In one embodiment, the transmission scheme of the first radio signal comprises one or a group of a plurality of with or without repetitions, number of repetitions, whether repetitions are allowed within a slot, a maximum repetition number within a slot, whether positions of starting multiple symbols of multiple repetitions are the same in corresponding slots, and transmission scheme of repetitions.

In one embodiment, the transmission scheme of the first radio signal comprises with or without repetitions.

In one embodiment, the transmission scheme of the first radio signal comprises number of repetitions.

In one embodiment, the transmission scheme of the first radio signal comprises whether repetitions are allowed within a slot.

In one embodiment, the transmission scheme of the first radio signal comprises a maximum number of repetitions within a slot.

In one embodiment, the transmission scheme of the first radio signal comprises that positions of starting multicarrier symbols of multiple repetitions in corresponding slots are the same.

In one embodiment, the transmission scheme of the first radio signal comprises a repetition scheme, and the repetition scheme comprises slot based repetitions, mini-slot based repetitions and multi-segment transmission.

Embodiment 2

Figure 2:
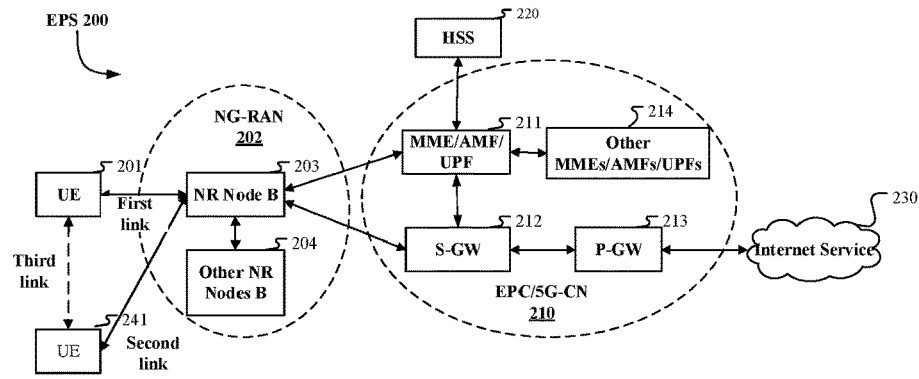
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
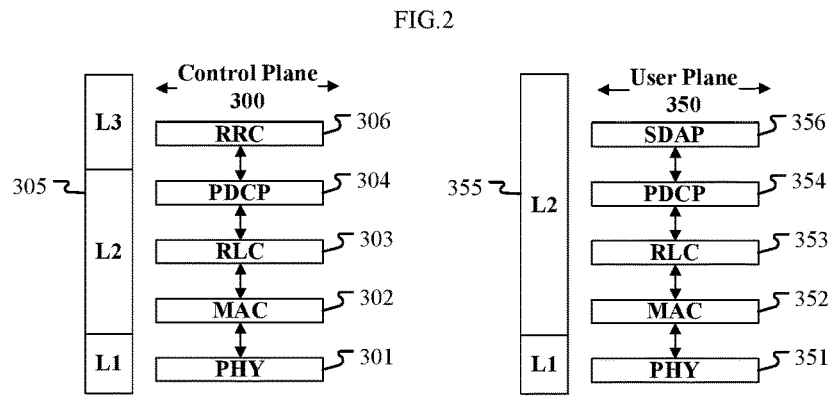
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the first signaling in the present disclosure is generated by the PHY 301.

In one embodiment, the second signaling in the present disclosure is generated by the PHY 301.

In one embodiment, the monitoring in the present disclosure is generated by the PHY 301.

In one embodiment, the first radio signal in the present disclosure is generated by the PHY 301.

In one embodiment, the second bit block in the present disclosure is generated by the PHY 301.

Embodiment 4

Figure 4:
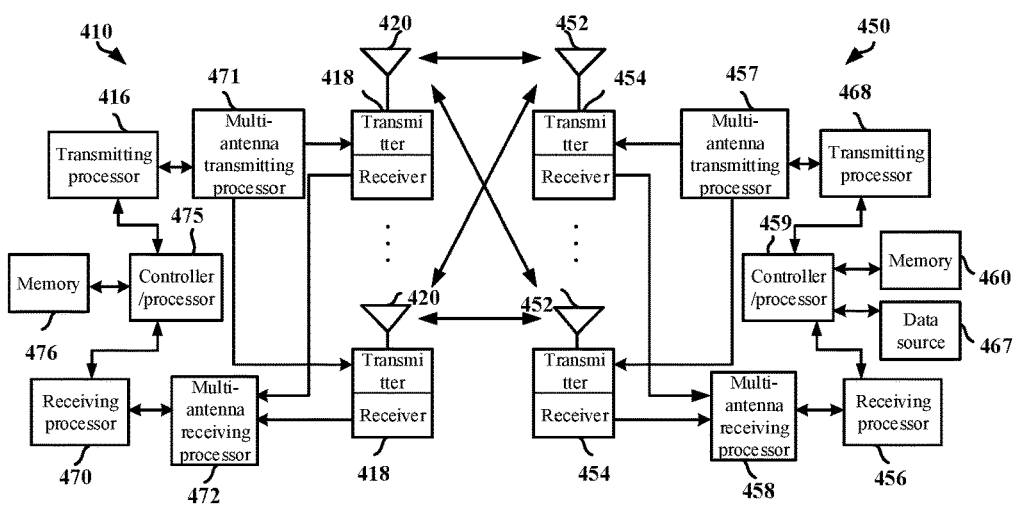
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling, the first signaling is used to indicate a first symbol set; and operates a first radio signal in only a first symbol group in the first symbol set; herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first signaling, the first signaling being used to indicate a first symbol set; and operating a first radio signal in only a first symbol group in the first symbol set; herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling, the first signaling is used to indicate a first symbol set; and executes a first radio signal in only a first symbol group in the first symbol set; herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first signaling, the first signaling being used for indicating a first symbol set; and executing a first radio signal in only a first symbol group in the first symbol set; herein, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, at least one of the antenna 420, the transmitter 418, the multi-antenna transmitting processor 471, the transmitting processor 416, the controller/processor 475, or the memory 476 is used to transmit the first information in the present disclosure.

In one embodiment, at least one of the antenna 452, the receiver 454, the multi-antenna receiving processor 458, the receiving processor 456, the controller/processor 459, the memory 460, or the data source 467 is used to receive the second signaling in the present disclosure.

In one embodiment, at least one of the antenna 420, the transmitter 418, the multi-antenna transmitting processor 471, the transmitting processor 416, the controller/processor 475, or the memory 476 is used to transmit the second signaling in the present disclosure.

In one embodiment, at least one of the antenna 452, the receiver 454, the multi-antenna receiving processor 458, the receiving processor 456, the controller/processor 459, the memory 460, or the data source 467 is used to receive the third information in the present disclosure.

In one embodiment, at least one of the antenna 420, the transmitter 418, the multi-antenna transmitting processor 471, the transmitting processor 416, the controller/processor 475, or the memory 476 is used to transmit the third information in the present disclosure.

In one embodiment, at least one of the antenna 452, the receiver 454, the multi-antenna receiving processor 458, the receiving processor 456, the controller/processor 459, the memory 460, or the data source 467 is used to monitor the first signaling in the present disclosure in only the second symbol group in the second symbol set in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the receiver 454, the multi-antenna receiving processor 458, the receiving processor 456, the controller/processor 459, the memory 460, or the data source 467 is used to receive the first radio signal in the present disclosure in only the first symbol group in the first symbol set in the present disclosure, and the operating action is receiving.

In one embodiment, at least one of the antenna 420, the transmitter 418, the multi-antenna transmitting processor 471, the transmitting processor 416, the controller/processor 475, or the memory 476 is used to transmit the first radio signal in the present disclosure in only the first symbol group in the first symbol set in the present disclosure, and the executing action is transmitting.

In one embodiment, at least one of the antenna 452, the transmitter 454, the multi-antenna transmitting processor 458, the transmitting processor 468, the controller/processor 459, the memory 460, or the data source 467 is used to transmit the first radio signal in the present disclosure in only the first symbol group in the first symbol set in the present disclosure, and the operating action is transmitting.

In one embodiment, at least one of the antenna 420, the receiver 418, the multi-antenna receiving processor 472, the receiving processor 470, the controller/processor 475, or the memory 476 is used to receive the first radio signal in the present disclosure in only the first symbol group in the first symbol set in the present disclosure, and the executing action is receiving.

In one embodiment, at least one of the antenna 452, the transmitter 454, the multi-antenna transmission processor 458, the transmitting processor 468, the controller/processor 459, the memory 460, or the data source 467 is used for the behavior in the present disclosure of judging whether a second bit block is transmitted in a first time-frequency resource group.

In one embodiment, at least one of the antenna 452, the transmitter 454, the multi-antenna transmitting processor 458, the transmitting processor 468, the controller/processor 459, the memory 460, or the data source 467 is used to transmit the second bit block in the present disclosure in the first time-frequency resource group in the present disclosure.

In one embodiment, at least one of the antenna 452, the transmitter 454, the multi-antenna transmission processor 458, the transmitting processor 468, the controller/processor 459, the memory 460, or the data source 467 is used to drop transmitting the second bit block in the present disclosure in the first time-frequency resource group in the present disclosure.

Embodiment 5

Figure 5:
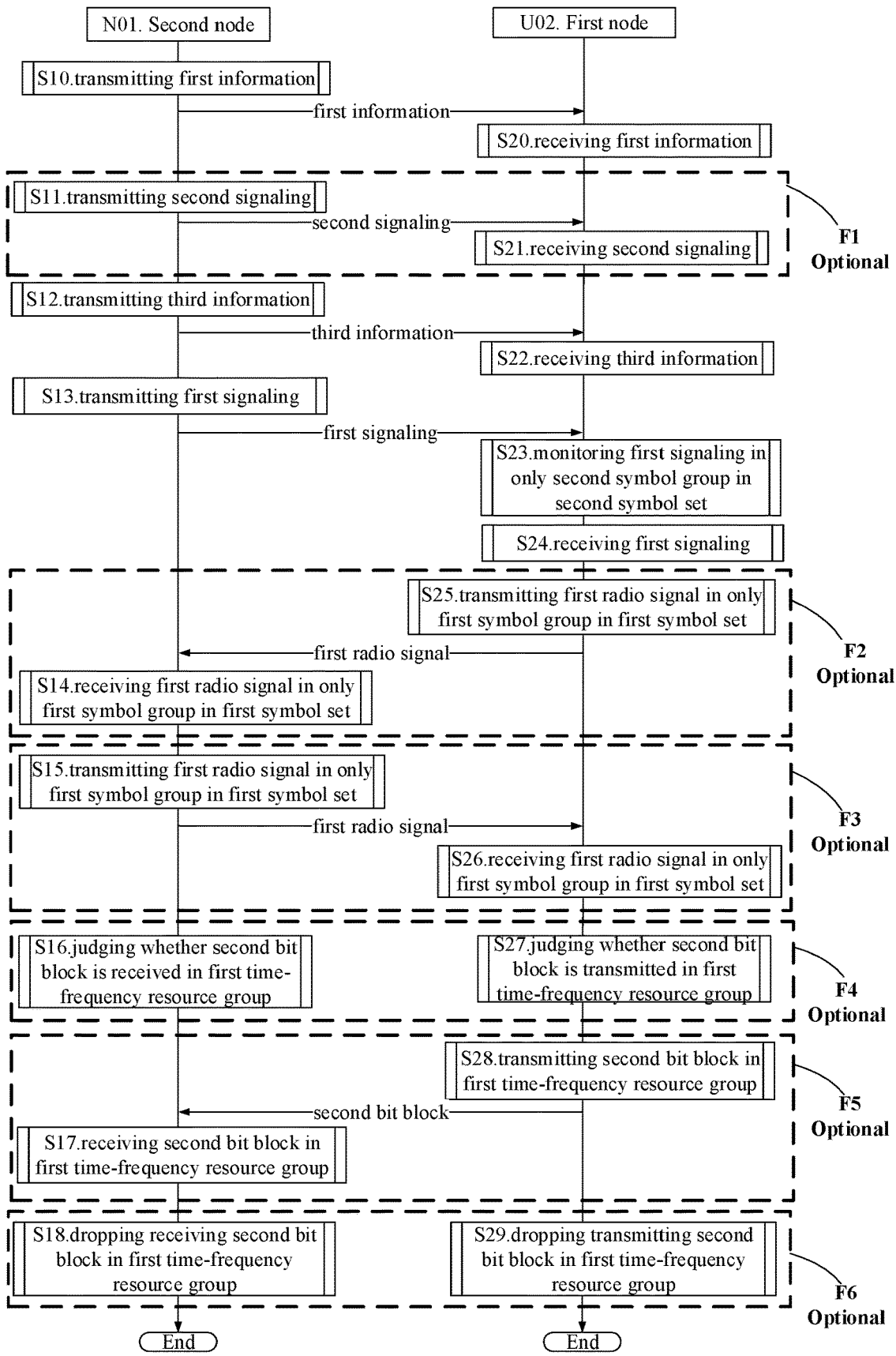
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U02 and a second node N01 are in communications through an air interface. In FIG. 5, the dotted box F1 is optional, and one and only one of F2 and F3 is optional, and F4, F5 and F6 are optional.

The first node U02 receives first information in step S20; receives a second signaling in step S21; receives third information in step S22; in step S23, monitors a first signaling in only a second symbol group in a second symbol set; receives a first signaling in step S24; transmits a first radio signal in only a first symbol group in a first symbol set in step S25; receives a first radio signal in only a first symbol group in a first symbol set in step S26; judges whether a second bit block is transmitted in a first time-frequency resource group in step S27; transmits a second bit block in a first time-frequency resource group in step S28; and drops transmitting a second bit block in a first time-frequency resource group in step S29.

The second node N01 transmits first information in step S10; transmits a second signaling in step S11; transmits third information in step S12; transmits a first signaling in step S13; receives a first radio signal in only a first symbol group in a first symbol set in step S14; transmits a first radio signal in only a first symbol group in a first symbol set in step S15; judges whether a second bit block is received in a first time-frequency resource group in step S16; receives a second bit block in a first time-frequency resource group in step S17; and drops receiving a second bit block in a first time-frequency resource group in step S18.

In Embodiment 5, the first signaling is used to indicate a first symbol set; the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration; the second signaling is used to indicate a first slot format; the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set, or the first slot format and the target TDD configuration are used together to determine the first symbol group out of the first symbol set; the third information is used to indicate a second symbol set; the first signaling is transmitted in only a second symbol group in the second symbol set; no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set; the operating action in the present disclosure is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is transmitted in a first time-frequency resource group.

In one embodiment, the operating action in the present disclosure is transmitting, and the executing action in the present disclosure is receiving; the dotted box F2 exists, and the dotted box F3 does not exist.

In one embodiment, the operating action in the present disclosure is receiving, and the executing action in the present disclosure is transmitting; the dotted box F2 does not exist, and the dotted box F3 exists.

In one embodiment, when the dotted box F2 exists, the dotted box F3 does not exist.

In one embodiment, when the dotted box F2 does not exist, the dotted box F3 exists.

In one embodiment, the dotted box F2 exists, the dotted box F3 does not exist, and the dotted boxes F4, F5 and F6 do not exist.

In one embodiment, the dotted box F2 does not exist, the dotted box F3 exists, and the dotted boxes F4, F5 and F6 do not exist.

In one embodiment, the dotted box F2 does not exist, the dotted box F3 exists, the dotted box F4 exists, and one and only one of the dotted boxes F5 and F6 exists.

In one embodiment, the dotted box F2 does not exist, the dotted box F3 exists, the dotted box F4 exists, the dotted box F5 exists, and the dotted box F6 does not exist.

In one embodiment, the dotted box F2 does not exist, the dotted box F3 exists, the dotted box F4 exists, the dotted box F5 does not exist, and the dotted box F6 exists.

In one embodiment, the first information is semi-statically configured.

In one embodiment, the first information is carried by a Radio Resource Control (RRC) signaling.

In one embodiment, the first information is carried by a MAC CE signaling.

In one embodiment, the first information comprises one or more Information Elements (IEs) in an RRC signaling.

In one embodiment, the first information comprises all or partial an IE in an RRC signaling.

In one embodiment, the first information comprises partial fields of an IE in an RRC signaling.

In one embodiment, the first information comprises multiple IEs in an RRC signaling.

In one embodiment, the first information comprises an IE in an RRC signaling.

In one embodiment, the first information comprises tdd-UL-DL-ConfigurationCommon.

In one embodiment, the first information comprises tdd-UL-DL-ConfigurationCommon and tdd-UL-DL-ConfigDedicated.

In one embodiment, the first information comprises partial or all fields of an IE TDD-UL-DL-Config.

In one embodiment, the first information comprises partial fields of an IE TDD-UL-DL-Config.

In one embodiment, the first information comprises an IE TDD-UL-DL-Config.

In one embodiment, the first information is used to indicate a first TDD configuration.

In one embodiment, the first information explicitly indicates a first TDD configuration.

In one embodiment, the first information implicitly indicates a first TDD configuration.

In one embodiment, the first TDD configuration indicates a type of each multicarrier symbol in a slot configuration period, and the first information indicates types of partial or all multicarrier symbols in the slot configuration period.

In one subembodiment of the above embodiment, the first information comprises tdd-UL-DL-ConfigurationCommon, the first TDD configuration is pattern1, the slot configuration period is P, and the specific meaning of the pattern1 and P can be found in 3GPP TS38.213, section 11.1.

In one subembodiment of the above embodiment, the first information comprises tdd-UL-DL-ConfigurationCommon and tdd-UL-DL-ConfigDedicated, the first TDD configuration comprises pattern1 and pattern2, the slot configuration period is P+P2, and the specific meanings of the pattern1, the pattern2, the P and the P2 can be found in 3GPP TS38.213, section 11.1.

In one subembodiment of the above embodiment, the slot configuration period comprises a slot.

In one subembodiment of the above embodiment, the slot configuration period comprises at least one slot.

In one subembodiment of the above embodiment, the slot configuration period comprises at least one multicarrier symbol.

In one subembodiment of the above embodiment, the first information indicates types of all multicarrier symbols in the slot configuration period.

In one subembodiment of the above embodiment, the first information indicates types of partial multicarrier symbols in the slot configuration period.

In one subembodiment of the above embodiment, the first information indicates types of partial multicarrier symbols in the slot configuration period, and types of other multicarrier symbols in the slot configuration period are predefined.

In one subembodiment of the above embodiment, the first information indicates multicarrier symbols whose types are DL and UL within the slot configuration period.

In one subembodiment of the above embodiment, the first information indicates multicarrier symbols whose types are DL and UL within the slot configuration period, and types of multicarrier symbols other than multicarrier symbols indicated by the first information within the slot configuration period are Flexible.

In one subembodiment of the above embodiment, the first information indicates at least one multicarrier symbol within the slot configuration period, types of multicarrier symbols other than multicarrier symbols indicated by the first information within the slot configuration period are Flexible.

In one subembodiment of the above embodiment, the first information indicates at least one multicarrier symbol in the slot configuration period, type(s) of multicarrier symbol(s) indicated by the first information is(are) a least one of DL, UL or Flexible, and a multicarrier symbol other than multicarrier symbol(s) indicated by the first information within the slot configuration period is Flexible.

In one subembodiment of the above embodiment, the first information indicates at least one multicarrier symbol in the slot configuration period, type(s) of multicarrier symbol(s) indicated by the first information is(are) a least DL and UL among DL, UL and Flexible, and a multicarrier symbol other than multicarrier symbol(s) indicated by the first information in the slot configuration period is Flexible.

In one embodiment, a method in the first node also comprises:

receiving second information;

herein, the second information is carried by a higher-layer signaling, and the second information is used to determine the second TDD configuration.

In one embodiment, the first receiver also receives second information; herein, the second information is carried by a higher-layer signaling, and the second information is used to determine the second TDD configuration.

In one embodiment, a method in the second node also comprises:

transmitting second information (R16 URLLC UL/DL SFI);

herein, the second information is carried by a higher-layer signaling, and the second information is used to determine the second TDD configuration.

In one embodiment, the second transmitter also transmits second information (R16 URLLC UL/DL SFI);

herein, the second information is carried by a higher-layer signaling, and the second information is used to determine the second TDD configuration.

In one embodiment, the second information is semi-statically configured.

In one embodiment, the second information is carried by an RRC signaling.

In one embodiment, the second information is carried by a MAC CE signaling.

In one embodiment, the second information comprises one or more IEs in an RRC signaling.

In one embodiment, the second information comprises all or partial an IE in an RRC signaling.

In one embodiment, the second information comprises partial fields of an IE in an RRC signaling.

In one embodiment, the second information comprises multiple IEs of an RRC signaling.

In one embodiment, the second information comprises an IE of an RRC signaling.

In one embodiment, the second information comprises partial fields of IE TDD-UL-DL-Config.

In one embodiment, both the second information and the first information belong to a same IE in an RRC signaling.

In one embodiment, both the second information and the first information belong to an IE TDD-UL-DL-Config in an RRC signaling.

In one embodiment, the second information and the first information respectively belong to two IEs in an RRC signaling.

In one embodiment, the second information is used to indicate a second TDD configuration.

In one embodiment, the second information explicitly indicates a second TDD configuration.

In one embodiment, the second information implicitly indicates a second TDD configuration.

In one embodiment, the second TDD configuration indicates a type of each multicarrier symbol within a slot configuration period, and the second information indicates types of partial or all multicarrier symbols within the slot configuration period.

In one subembodiment of the above embodiment, the slot configuration period indicated by the second TDD configuration and the slot configuration period indicated by the first TDD configuration are the same.

In one subembodiment of the above embodiment, the slot configuration period indicated by the second TDD configuration and the slot configuration period indicated by the first TDD configuration are different.

In one subembodiment of the above embodiment, the slot configuration period comprises a slot.

In one subembodiment of the above embodiment, the slot configuration period comprises at least one slot.

In one subembodiment of the above embodiment, the slot configuration period comprises at least one multicarrier symbol.

In one subembodiment of the above embodiment, the second information indicates types of all multicarrier symbols in the slot configuration period.

In one subembodiment of the above embodiment, the second information indicates types of partial multicarrier symbols in the slot configuration period.

In one subembodiment of the above embodiment, the second information indicates types of partial multicarrier symbols within the slot configuration period, and types of other multicarrier symbols within the slot configuration period are predefined.

In one subembodiment of the above embodiment, the second information indicates multicarrier symbols whose types are DL and UL within the slot configuration period.

In one subembodiment of the above embodiment, the second information indicates multicarrier symbols whose types are DL and UL within the slot configuration period, and a type of a multicarrier symbol other than multicarrier symbols indicated by the second information within the slot configuration period is Flexible.

In one subembodiment of the above embodiment, the second information indicates at least one multicarrier symbol within the slot configuration period, a type of a multicarrier symbol other than multicarrier symbols indicated by the second information in the slot configuration period is Flexible.

In one subembodiment of the above embodiment, the second information indicates at least one multicarrier symbol within the slot configuration period, type(s) of multicarrier symbol(s) indicated by the second information is(are) at least one of DL, UL, or Flexible, and a type of a multicarrier symbol other than multicarrier symbol(s) indicated by the second information in the slot configuration period is Flexible.

In one subembodiment of the above embodiment, the second information indicates at least one multicarrier symbol within the slot configuration period, type(s) of multicarrier symbol(s) indicated by the second information is(are) DL and UL in at least one of DL, UL, or Flexible, and a type of a multicarrier symbol other than multicarrier symbol(s) indicated by the second information in the slot configuration period is Flexible.

In one embodiment, the second signaling is dynamically configured.

In one embodiment, the second signaling is a physical-layer signaling.

In one embodiment, the second signaling is a DCI signaling.

In one embodiment, the second signaling is transmitted on a downlink physical layer control channel (i.e., a downlink channel only capable of bearing a physical layer signaling).

In one embodiment, the second signaling indicates a slot format.

In one embodiment, the second signaling is DCI format 2_0, and the specific meaning of the DCI format 2_0 can be found in 3GPP TS38.212, section 7.3.1.3.

In one embodiment, the first node is configured to monitor the second signaling.

In one embodiment, a method in the first node also comprises:
receiving fourth information;
herein, the fourth information indicates a first identifier, and the second signaling carries the first identifier.

In one embodiment, the first receiver also receives fourth information; herein, the fourth information indicates a first identifier, and the second signaling carries the first identifier.

In one embodiment, a method in the second node also comprises:
transmitting fourth information;
herein, the fourth information indicates a first identifier, and the second signaling carries the first identifier.

In one embodiment, the second receiver also transmits fourth information; herein, the fourth information indicates a first identifier, and the second signaling carries the first identifier.

In one embodiment, the fourth information is used to configure that the first node monitors the second signaling.

In one embodiment, the fourth information is semi-statically configured.

In one embodiment, the fourth information is carried by an RRC signaling.

In one embodiment, the fourth information is carried by a MAC CE signaling.

In one embodiment, the fourth information comprises one or more IEs in an RRC signaling.

In one embodiment, the fourth information comprises all or part of an IE in an RRC signaling.

In one embodiment, the fourth information comprises an SFI-RNTI field in IE SlotFormatIndicator of an RRC signaling, and the specific meanings of the IE SlotFormatIndicator and the SFI-RNTI field can be found in 3GPP TS38.331, section 6.3.2.

In one embodiment, the first identifier is an SFI-RNTI.

In one embodiment, the first identifier is a non-negative integer.

In one embodiment, the first identifier is a signaling identifier of the second signaling.

In one embodiment, the second signaling is a DCI signaling identified by the first identifier.

In one embodiment, the first identifier is used to generate a Reference Signal (RS) sequence of DeModulation Reference Signals (DMRS) of the second signaling.

In one embodiment, a Cyclic Redundancy Check (CRC) bit sequence of the second signaling is scrambled by the first identifier.

In one embodiment, the monitoring refers to a blind detection, that is, a signal is received and a decoding operation is executed, when the decoding is determined to be correct according to a CRC bit, it is judged that a given radio signal is received; otherwise it is judged that a given radio signal is not received.

In one subembodiment of the above embodiment, the given radio signal is the second signaling.

In one subembodiment of the above embodiment, the given radio signal is the first signaling.

In one embodiment, the monitoring refers to a coherent detection, that is, an RS sequence of DMRS of a physical layer channel where a given radio signal is located is used for performing a coherent reception in given time-frequency resources, and energy of a radio signal obtained after the coherent reception is measured. When energy of a radio signal obtained after the coherent reception is greater than a first given threshold, it is judged that the given radio signal is received; otherwise it is judged that the given radio signal is not received.

In one subembodiment of the above embodiment, the given radio signal is the second signaling.

In one subembodiment of the above embodiment, the given radio signal is the first signaling.

In one embodiment, the monitoring refers to an energy detection, that is, energy of a radio signal is sensed in given time-frequency resources and is averaged in time to obtain received energy. When the received energy is greater than a second given threshold, it is judged that a given radio signal is received; otherwise it is judged that a given radio signal is not received.

In one subembodiment of the above embodiment, the given radio signal is the second signaling.

In one subembodiment of the above embodiment, the given radio signal is the first signaling.

In one embodiment, the monitoring refers to a coherent detection, that is, a sequence of a given radio signal is used for performing a coherent reception in given time-frequency resources, and energy of a radio signal obtained after the coherent reception is measured. When energy of a radio signal obtained after the coherent reception is greater than a third given threshold, it is judged that the given radio signal is received; otherwise it is judged that the given radio signal is not received.

In one subembodiment of the above embodiment, the given radio signal is the second signaling.

In one subembodiment of the above embodiment, the given radio signal is the first signaling.

In one embodiment, the monitoring refers to a blind detection, that is, a signal is received and a decoding operation is executed, when the decoding is determined to be correct according to a CRC bit, it is judged that a given radio signal is detected; otherwise it is judged that a given radio signal is not detected.

In one subembodiment of the above embodiment, the given radio signal is the second signaling.

In one subembodiment of the above embodiment, the given radio signal is the first signaling.

In one embodiment, the monitoring refers to a coherent detection, that is, an RS sequence of DMRS of a physical layer channel where a given radio signal is located is used for performing a coherent reception in given time-frequency resources, and energy of a radio signal obtained after the coherent reception is measured. When energy of a radio signal obtained after the coherent reception is greater than a first given threshold, it is judged that the given radio signal is detected; otherwise it is judged that the given radio signal is not detected.

In one subembodiment of the above embodiment, the given radio signal is the second signaling.

In one subembodiment of the above embodiment, the given radio signal is the first signaling.

In one embodiment, the monitoring refers to an energy detection, that is, energy of a radio signal is sensed in given time-frequency resources and is averaged in time to obtain received energy. When the received energy is greater than a second given threshold, it is judged that a given radio signal is detected; otherwise it is judged that a given radio signal is not detected.

In one subembodiment of the above embodiment, the given radio signal is the second signaling.

In one subembodiment of the above embodiment, the given radio signal is the first signaling.

In one embodiment, the monitoring refers to a coherent detection, that is, a sequence of a given radio signal is used for performing a coherent reception in given time-frequency resources, and energy of a radio signal obtained after the coherent reception is measured. When energy of a radio signal obtained after the coherent reception is greater than a third given threshold, it is judged that the given radio signal is detected; otherwise it is judged that the given radio signal is not detected.

In one subembodiment of the above embodiment, the given radio signal is the second signaling.

In one subembodiment of the above embodiment, the given radio signal is the first signaling.

In one embodiment, the first slot format is Slot Format.

In one embodiment, the first slot format is a slot format of a slot.

In one embodiment, the first slot format indicates a type of each multicarrier symbol in a slot.

In one embodiment, the first slot format indicates type(s) of at least one multicarrier symbol.

In one embodiment, the first slot format is a slot format of each slot in a number of slots starting from the first node monitoring a slot of the second signaling.

In one embodiment, a value of the first slot format is a non-negative integer other than 255.

In one embodiment, a value of the first slot format is a non-negative less than 255.

In one embodiment, the second signaling explicitly indicates a first slot format.

In one embodiment, the second signaling implicitly indicates a first slot format.

In one embodiment, the second signaling indicates at least one Slot Format Indicator (SFI) value, and the first slot format is a slot format corresponding to one of the at least one SFI value.

In one embodiment, the third information is semi-statically configured.

In one embodiment, the third information is carried by an RRC signaling.

In one embodiment, the third information is carried by a MAC CE signaling.

In one embodiment, the third information comprises one or more IEs in an RRC signaling.

In one embodiment, the third information comprises all or partial an IE in an RRC signaling.

In one embodiment, the third information comprises partial fields of an IE in an RRC signaling.

In one embodiment, the third information comprises multiple IEs in an RRC signaling.

In one embodiment, the third information comprises an IE in an RRC signaling.

In one embodiment, the third information comprises partial or all fields in an IE.

In one embodiment, the third information comprises partial fields in an IE.

In one embodiment, the third information comprises partial or all fields in an IE PDCCH-ConfigSIB1, and the specific meaning of the IE PDCCH-ConfigSIB1 can be found in 3GPP TS38.331, section 6.3.2.

In one embodiment, the third information comprises partial or all fields in an IE PDCCH-ConfigCommon, and the specific meaning of the IE PDCCH-ConfigCommon can be found in 3GPP TS38.331, section 6.3.2.

In one embodiment, the third information comprises partial or all fields in an IE PDCCH-Config, and the specific meaning of the IE PDCCH-Config can be found in 3GPP TS38.331, section 6.3.2.

In one embodiment, the third information comprises an IE ControlResourceSet, and the specific meaning of the IE ControlResourceSet can be found in 3GPP TS38.331, section 6.3.2.

In one embodiment, the third information comprises an IE PDCCH-Config and an IE ControlResourceSet.

In one embodiment, the third information explicitly indicates a second symbol set.

In one embodiment, the third information implicitly indicates a second symbol set.

In one embodiment, there exists a multicarrier symbol in the second symbol set not belonging to the second symbol group, and the first signaling is not monitored in any multicarrier symbol other than the second symbol group in the second symbol set.

In one embodiment, the first time-frequency resource group comprises at least one multi-carrier symbol in time domain.

In one embodiment, the first time-frequency resource group comprises at least one sub-carrier in frequency domain.

In one embodiment, the first time-frequency resource group comprises at least one Resource Block (RB) in frequency domain.

In one embodiment, the first time-frequency resource group comprises at least one RE.

In one embodiment, the first time-frequency resource group is time-frequency resources allocated to a Physical Uplink Control CHannel (PUCCH).

In one embodiment, the first signaling explicitly indicates the first time-frequency resource group.

In one embodiment, the first signaling implicitly indicates the first time-frequency resource group.

In one embodiment, the first signaling comprises a second field, and the second field comprised in the first signaling is used to determine the first time-frequency resource group.

In one subembodiment of the above embodiment, the second field comprised in the first signaling comprises at least one bit.

In one subembodiment of the above embodiment, the second field comprised in the first signaling is used to indicate the first time-frequency resource group out of a first time-frequency resource group set, the first time-frequency resource group set comprises at least one time-frequency resource group, and the first time-frequency resource group is a time-frequency resource group in the first time-frequency resource group set.

In one subembodiment of the above embodiment, the second field comprised in the first signaling indicates an index of the first time-frequency resource group in a first time-frequency resource group set, the first time-frequency resource group set comprises at least one time-frequency resource group, and the first time-frequency resource group is a time-frequency resource group in the first time-frequency resource group set.

In one subembodiment of the above embodiment, the second field comprised in the first signaling is a PUCCH resource indicator, and the specific meaning of the PUCCH resource indicator can be found in 3GPP TS38.213, section 9.2.3.

In one embodiment, a Hybrid Automatic Repeat reQuest ACKnowledgement (HARQ-ACK feedback) for the first radio signal is carried in the second bit block.

Embodiment 6

Figure 6:
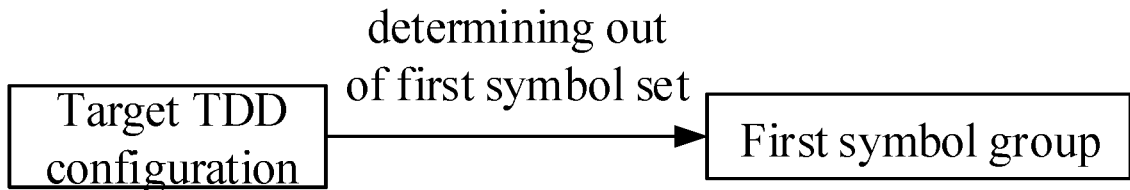
FIG. 6 illustrates a schematic diagram of determining a first symbol group according to one embodiment of the present disclosure.

Embodiment 6 illustrates a schematic diagram of determining a first symbol group according to one embodiment of the present disclosure, as shown in FIG. 6.

In embodiment 6, the target TDD configuration in the present disclosure is used to determine the first symbol group out of the first symbol set in the present disclosure.

In one embodiment, the first symbol group is the first symbol set.

In one embodiment, there exists a multicarrier symbol in the first symbol set not belonging to the first symbol group.

In one embodiment, the operating action and the target TDD configuration are used together to determine the first symbol group out of the first symbol set.

In one embodiment, the target TDD configuration is used to determine a type of each multicarrier symbol in the first symbol set; and the operating action and the type of each multicarrier symbol in the first symbol set are used together to determine the first symbol group out of the first symbol set.

In one embodiment, the operating action is receiving; a given symbol is a multicarrier symbol in the first symbol set; when the target TDD configuration is used to determine that a type of the given symbol is a UL symbol, the given symbol does not belong to the first symbol group.

In one embodiment, the operating action is receiving; a given symbol is a multicarrier symbol in the first symbol set; when the target TDD configuration is used to determine that a type of the given symbol is a DL symbol, the given symbol belongs to the first symbol group.

In one embodiment, the operating action is receiving; a given symbol is a multicarrier symbol in the first symbol set; when the target TDD configuration is used to determine that a type of the given symbol is a Flexible symbol, the given symbol belongs to the first symbol group.

In one embodiment, the operating action is receiving; a given symbol is a multicarrier symbol in the first symbol set; when the target TDD configuration is used to determine that a type of the given symbol is a Flexible symbol, the given symbol does not belong to the first symbol group.

In one embodiment, the operating action is receiving; when the first node is not configured to monitor DCI format 2_0, a given symbol is a multicarrier symbol in the first symbol set, and when the target TDD configuration is used to determine a type of the given symbol is a Flexible symbol, the given symbol belongs to the first symbol group.

In one embodiment, the operating action is receiving; the first symbol set comprises a plurality of symbol subsets, and any symbol subset in the plurality of symbol subsets comprises at least one multicarrier symbol; a given symbol subset is one of the plurality of symbol subsets; when the target TDD configuration is used to determine that a type of at least one multicarrier symbol in the given symbol subset is a UL symbol, none of multicarrier symbols comprised in the given symbol subset belongs to the first symbol group.

In one subembodiment of the above embodiment, the plurality of symbol subsets respectively belongs to a plurality of slots.

In one subembodiment of the above embodiment, there does not exist a multicarrier symbol belonging to two symbol subsets in the plurality of symbol subsets.

In one embodiment, the operating action is transmitting; a given symbol is a multicarrier symbol in the first symbol set; when the target TDD configuration is used to determine that a type of the given symbol is a DL symbol, the given symbol does not belong to the first symbol group.

In one embodiment, the operating action is transmitting; a given symbol is a multicarrier symbol in the first symbol set; when the target TDD configuration is used to determine that a type of the given symbol is a UL symbol, the given symbol belongs to the first symbol group.

In one embodiment, the operating action is transmitting; a given symbol is a multicarrier symbol in the first symbol set; when the target TDD configuration is used to determine that a type of the given symbol is a Flexible symbol, the given symbol belongs to the first symbol group.

In one embodiment, the operating action is transmitting; a given symbol is a multicarrier symbol in the first symbol set; when the target TDD configuration is used to determine that a type of the given symbol is a Flexible symbol, the given symbol does not to the first symbol group.

In one embodiment, the operating action is transmitting; when the first node is not configured to monitor DCI format 2_0, a given symbol is a multicarrier symbol in the first symbol set, and when the target TDD configuration is used to determine a type of the given symbol is a Flexible symbol, the given symbol belongs to the first symbol group.

In one embodiment, the operating action is transmitting; the first symbol set comprises a plurality of symbol subsets, and any symbol subset in the plurality of symbol subsets comprises at least one multicarrier symbol; a given symbol subset is one of the plurality of symbol subsets; when the target TDD configuration is used to determine that a type of at least one multicarrier symbol in the given symbol subset is a DL symbol, none of multicarrier symbols comprised in the given symbol subset belongs to the first symbol group.

In one subembodiment of the above embodiment, the plurality of symbol subsets respectively belongs to a plurality of slots.

In one subembodiment of the above embodiment, there does not exist a multicarrier symbol belonging to two symbol subsets in the plurality of symbol subsets.

In one embodiment, the first node is configured to monitor a second signaling; a given symbol is a multicarrier symbol in the first symbol set; when the target TDD configuration indicates that a type of the given symbol is Flexible, whether the given symbol belongs to the first symbol group is related to whether the second signaling is detected.

In one subembodiment of the above embodiment, when the first node detects the second signaling, whether the given symbol belongs to the first symbol group is related to a type of the given symbol indicated by the second signaling.

In one subembodiment of the above embodiment, when the first node does not detect the second signaling, the given symbol belongs to the first symbol group.

In one embodiment, the first node is configured to monitor a second signaling, and the first node detects the second signaling; a given symbol is a multicarrier symbol in the first symbol set; the operating action is receiving, the first node does not expect that a type of the given symbol indicated by the second signaling is a UL symbol.

In one subembodiment of the above embodiment, the first node receives the second signaling.

In one subembodiment of the above embodiment, the second signaling is DCI format 2_0, and the second signaling indicates a slot format value other than 255 to indicate a format of a slot to which the given symbol belongs.

In one embodiment, the first node is configured to monitor a second signaling, and the first node detects the second signaling; a given symbol is a multicarrier symbol in the first symbol set; the operating action is transmitting, the first node does not expect that a type of the given symbol indicated by the second signaling is a DL symbol.

In one subembodiment of the above embodiment, the first node receives the second signaling.

In one subembodiment of the above embodiment, the second signaling is DCI format 2_0, and the second signaling indicates a slot format value other than 255 to indicate a format of a slot to which the given symbol belongs.

In one embodiment, the first node is configured to monitor a second signaling, and the first node detects the second signaling; a given symbol is a multicarrier symbol in the first symbol set; when the target TDD configuration is used to determine that a type of the given symbol is a DL symbol, the first node does not expect that a type of the given symbol indicated by the second signaling is a UL symbol.

In one subembodiment of the above embodiment, the first node receives the second signaling.

In one subembodiment of the above embodiment, the second signaling is DCI format 2_0, and the second signaling indicates a slot format value other than 255 to indicate a format of a slot to which the given symbol belongs.

In one embodiment, the first node is configured to monitor a second signaling, and the first node detects the second signaling; a given symbol is a multicarrier symbol in the first symbol set; when the target TDD configuration is used to determine that a type of the given symbol is UL symbol, the first node does not expect that a type of the given symbol indicated by the second signaling is DL symbol.

In one subembodiment of the above embodiment, the first node receives the second signaling.

In one subembodiment of the above embodiment, the second signaling is DCI format 2_0, and the second signaling indicates a slot format value other than 255 to indicate a format of a slot to which the given symbol belongs.

In one embodiment, the first node is configured to monitor a second signaling, and the first node detects the second signaling; a given symbol is a multicarrier symbol in the first symbol set; when the target TDD configuration is used to determine that a type of the given symbol is a Flexible symbol, and whether the given symbol belongs to the first symbol group is related to a type of the given symbol indicated by the second signaling.

In one subembodiment of the above embodiment, the first node receives the second signaling.

In one subembodiment of the above embodiment, the second signaling is DCI format 2_0, and the second signaling indicates a slot format value other than 255 to indicate a format of a slot to which the given symbol belongs.

In one subembodiment of the above embodiment, when the second signaling indicates that a type of the given symbol is a Flexible symbol, the given symbol belongs to the first symbol group.

In one subembodiment of the above embodiment, the operating action is receiving; the first node does not expect to detect that a type of the given symbol indicated by the second signaling is a UL symbol.

In one subembodiment of the above embodiment, the operating action is transmitting; the first node does not expect to detect that a type of the given symbol indicated by the second signaling is a DL symbol.

In one subembodiment of the above embodiment, the operating action is receiving; when and only when the type of the given symbol indicated by the second signaling is a DL symbol, the given symbol belongs to the first symbol group; when the second signaling indicates that the type of the given symbol is a UL symbol or Flexible, the given symbol does not belong to the first symbol group.

In one subembodiment of the above embodiment, the operating action is receiving; when and only when the type of the given symbol indicated by the second signaling is a DL symbol or Flexible, the given symbol belongs to the first symbol group; when the type of the given symbol indicated by the second signaling is a UL symbol, the given symbol does not belong to the first symbol group.

In one subembodiment of the above embodiment, the operating action is transmitting; when and only when the type of the given symbol indicated by the second signaling is a UL symbol, the given symbol belongs to the first symbol group; when the second signaling indicates that the type of the given symbol is a DL symbol or Flexible, the given symbol does not belong to the first symbol group.

In one subembodiment of the above embodiment, the operating action is transmitting; when and only when the type of the given symbol indicated by the second signaling is a UL symbol or Flexible, the given symbol belongs to the first symbol group; when the type of the given symbol indicated by the second signaling is a DL symbol, the given symbol does not belong to the first symbol group.

Embodiment 7

Figure 7:
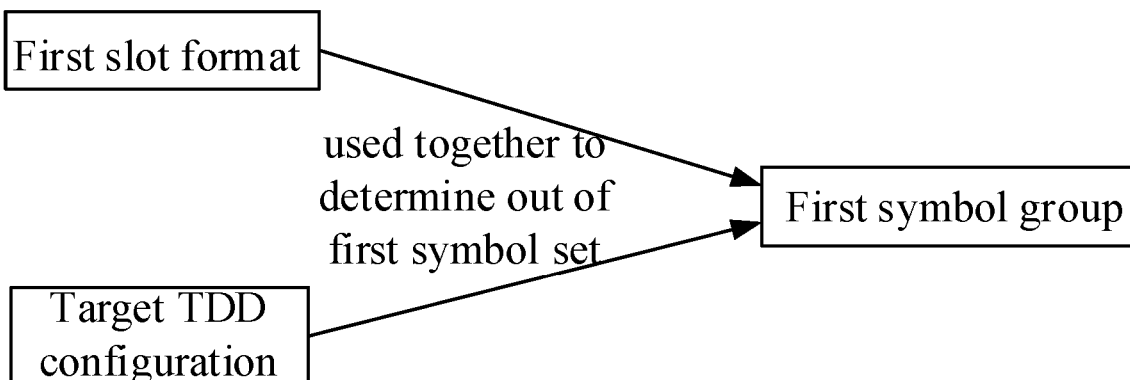
FIG. 7 illustrates a schematic diagram of determining a first symbol group according to one embodiment of the present disclosure.

Embodiment 7 illustrates a schematic diagram of determining a first symbol group according to another embodiment of the present disclosure, as shown in FIG. 7.

In embodiment 7, the first slot format in the present disclosure and the target TDD configuration are used together to determine the first symbol group out of the first symbol set in the present disclosure.

In one embodiment, the operating action, the first slot format and the target TDD configuration are used together to determine the first symbol group out of the first symbol set.

In one embodiment, the target TDD configuration is used to determine a type of each multicarrier symbol in the first symbol set, and the first slot format is used to indicate a type of each multicarrier symbol in the first symbol set; the operating action, the type of each multicarrier symbol in the first symbol set determined by the target TDD configuration and the type of each multicarrier symbol in the first symbol set indicated by the first slot format are used together to determine the first symbol group out of the first symbol set.

In one embodiment, a given symbol is a multicarrier symbol in the first symbol set; the operation is receiving, and the first node does not expect that a type of the given symbol indicated by the first slot format is a UL symbol.

In one embodiment, a given symbol is a multicarrier symbol in the first symbol set; the operating action is transmitting, and the first node does not expect that a type of the given symbol indicated by the first slot format is a DL symbol.

In one embodiment, a given symbol is a multicarrier symbol in the first symbol set; when the target TDD configuration is used to determine that a type of the given symbol is a DL symbol, the first node does not expect that a type of the given symbol indicated by the first slot format is a UL symbol.

In one embodiment, the operating action is receiving; a given symbol is a multicarrier symbol in the first symbol set; when the target TDD configuration is used to determine that a type of the given symbol is a DL symbol, and when a type of the given symbol indicated by the first slot format is a SL symbol, the given symbol belongs to the first symbol group.

In one embodiment, the operating action is receiving; a given symbol is a multicarrier symbol in the first symbol set; when the target TDD configuration is used to determine that a type of the given symbol is a DL symbol, and a type of the given symbol indicated by the first slot format is a Flexible symbol, the given symbol belongs to the first symbol group.

In one embodiment, the operating action is receiving; a given symbol is a multicarrier symbol in the first symbol set; when the target TDD configuration is used to determine that a type of the given symbol is a DL symbol, and a type of the given symbol indicated by the first slot format is a UL symbol, the given symbol does not belong to the first symbol group.

In one embodiment, a given symbol is a multicarrier symbol in the first symbol set; when the target TDD configuration is used to determine that a type of the given symbol is a UL symbol, the first node does not expect that a type of the given symbol indicated by the first slot format is a DL symbol.

In one embodiment, the operating action is transmitting; a given symbol is a multicarrier symbol in the first symbol set; when the target TDD configuration is used to determine that a type of the given symbol is a UL symbol, and when a type of the given symbol indicated by the first slot format is a UL symbol, the given symbol belongs to the first symbol group.

In one embodiment, the operating action is transmitting; a given symbol is a multicarrier symbol in the first symbol set; when the target TDD configuration is used to determine that a type of the given symbol is a UL symbol, and a type of the given symbol indicated by the first slot format is a Flexible symbol, the given symbol belongs to the first symbol group.

In one embodiment, the operating action is transmitting; a given symbol is a multicarrier symbol in the first symbol set; when the target TDD configuration is used to determine that a type of the given symbol is a UL symbol, and when a type of the given symbol indicated by the first slot format is a DL symbol, the given symbol does not belong to the first symbol group.

In one embodiment, a given symbol is a multicarrier symbol in the first symbol set; when the target TDD configuration is used to determine that a type of the given symbol is a Flexible symbol, whether the given symbol belongs to the first symbol group is related to a type of the given symbol indicated by the first slot format.

In one subembodiment of the above embodiment, when the first slot format indicates that a type of the given symbol is a Flexible symbol, the given symbol belongs to the first symbol group.

In one subembodiment of the above embodiment, the operating action is receiving; the first node does not expect to detect that the first slot format indicates that a type of the given symbol is a UL symbol.

In one subembodiment of the above embodiment, the operating action is transmitting; the first node does not expect to detect that the first slot format indicates that a type of the given symbol is a DL symbol.

In one subembodiment of the above embodiment, the operating action is receiving; when and only when the first slot format indicates that the type of the given symbol is a DL symbol, the given symbol belongs to the first symbol group; and when the first slot format indicates that the type of the given symbol is a UL symbol or Flexible, the given symbol does not belong to the first symbol group.

In one subembodiment of the above embodiment, the operating action is receiving; when and only when the first slot format indicates that the type of the given symbol is a DL symbol or Flexible, the given symbol belongs to the first symbol group; and when the first slot format indicates that the type of the given symbol is a UL symbol, the given symbol does not belong to the first symbol group.

In one subembodiment of the above embodiment, the operating action is transmitting; when and only when the first slot format indicates that the type of the given symbol is a UL symbol, the given symbol belongs to the first symbol group; and when the first slot format indicates that the type of the given symbol is a DL symbol or Flexible, the given symbol does not belong to the first symbol group.

In one subembodiment of the above embodiment, the operating action is transmitting; when and only when the first slot format indicates that the type of the given symbol is a UL symbol or Flexible, the given symbol belongs to the first symbol group; and when the first slot format indicates that the type of the given symbol is a DL symbol, the given symbol does not belong to the first symbol group.

Embodiment 8

Figure 8:
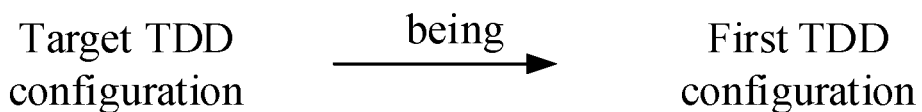
FIG. 8 illustrates a schematic diagram of determining a target TDD configuration according to one embodiment of the present disclosure.
Figure 8:
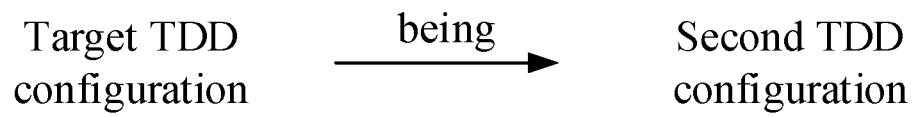

Embodiment 8 illustrates a schematic diagram of determining a target TDD configuration according one embodiment of the present disclosure, as shown in FIG. 8.

In embodiment 8, when a type of the first signaling in the present disclosure comprises a first type, the target TDD configuration is the first TDD configuration in the present disclosure; when the type of the first signaling comprises a second type, the target TDD configuration is a second TDD configuration.

In one embodiment, a type of the first signaling comprises a DCI format, and the first type and the second type are respectively different DCI formats.

In one subembodiment of the above embodiment, the operating action is transmitting, and the first type is DCI format 0_0 or DCI format 0_1.

In one subembodiment of the above embodiment, the operating action is receiving, and the first type is DCI format 1_0 or DCI format 1_1.

In one embodiment, a type of the first signaling comprises an RNTI.

In one subembodiment of the above embodiment, the first type is one of a Cell-RNTI (C-RNTI), a Configured Scheduling-RNTI (CS-RNTI) or a Semi-Persistent-Channel State Information-RNTI (SP-CSI-RNTI).

In one subembodiment of the above embodiment, the first type is one of a C-RNTI, a CS-RNTI, an SP-CSI-RNTI or an MCS-C-RNTI.

In one subembodiment of the above embodiment, the second type is a Modulation and Coding Scheme-C-RNTI (MCS-C-RNTI).

In one subembodiment of the above embodiment, the second type is not any one of a C-RNTI, a CS-RNTI, an SP-CSI-RNTI or an MCS-C-RNTI.

In one subembodiment of the above embodiment, the second type is not any of a C-RNTI, a CS-RNTI or an SP-CSI-RNTI.

In one embodiment, a type of the first signaling comprises a payload size.

In one subembodiment of the above embodiment, the first type and the second type are respectively two different payload sizes.

In one embodiment, a type of the first signaling comprises a priority.

In one subembodiment of the above embodiment, the first type and the second type are respectively different priorities.

In one embodiment, a type of the first signaling comprises a traffic type.

In one subembodiment of the above embodiment, the first type and the second type are respectively different traffic types.

In one embodiment, a type of the first signaling comprises a grant type, and the grant type is an uplink grant or a downlink grant.

In one subembodiment of the above embodiment, the first type is a downlink grant, and the second type is an uplink grant.

In one subembodiment of the above embodiment, the first type is an uplink grant, and the second type is a downlink grant.

In one embodiment, a type of the first signaling comprises a transmission scheme of the first radio signal.

In one subembodiment of the above embodiment, the first type and the second type are respectively different transmission schemes.

In one subembodiment of the above embodiment, the transmission scheme comprises one or a group of a plurality of with or without repetitions, number of repetitions, whether repetitions are allowed within a slot, a maximum repetition number within a slot, whether positions of starting multiple symbols of multiple repetitions are the same in corresponding slots, and transmission scheme of repetitions.

In one subembodiment of the above embodiment, the transmission scheme comprises with or without repetitions.

In one subembodiment of the above embodiment, the first type comprises without repetitions, and the second type comprises repetitions.

In one subembodiment of the above embodiment, the transmission scheme comprises a number of repetitions.

In one subembodiment of the above embodiment, a number of repetitions comprised in the first type is 1, and a number of repetitions comprised in the second type is greater than 1.

In one subembodiment of the above embodiment, the transmission scheme comprises whether repetitions are allowed within a slot.

In one subembodiment of the above embodiment, the first type comprises that repetitions are not allowed within a slot, and the second type comprises that repetitions are allowed within a slot.

In one subembodiment of the above embodiment, the transmission scheme comprises a maximum number of repetitions within a slot.

In one subembodiment of the above embodiment, the first type comprises that a maximum number of repetitions within a slot is 1, and the second type comprises that a maximum number of repetitions within a slot is greater than 1.

In one subembodiment of the above embodiment, the transmission scheme comprises whether positions of starting multicarrier symbols of respective multiple repetitions in corresponding slots are the same.

In one subembodiment of the above embodiment, the first type comprises that positions of starting multicarrier symbols of respective multiple repetitions in corresponding slots are the same, and the second type comprises that positions of starting multicarrier symbols of respective multiple repetitions in corresponding slots are different.

In one subembodiment of the above embodiment, the transmission scheme comprises transmission scheme of repetitions, and the transmission scheme of repetitions comprises slot based repetitions, mini-slot based repetitions, and multi-segment transmission.

In one subembodiment of the above embodiment, the first type comprises slot based repetitions, and the second type comprises mini-slot based repetitions or multi-segment transmission.

In one embodiment, the first TDD configuration is a TDD configuration.

In one embodiment, the first TDD configuration is a slot format.

In one embodiment, the first TDD configuration is semi-statically configured.

In one embodiment, the first TDD configuration is a configuration for a type of a multicarrier symbol in TDD system.

In one embodiment, the first TDD configuration is used to indicate a type of each multicarrier symbol in the first symbol set.

In one embodiment, the first TDD configuration explicitly indicates a type of each multicarrier symbol in the first symbol set.

In one embodiment, the first TDD configuration implicitly indicates a type of each multicarrier symbol in the first symbol set.

In one embodiment, the first TDD configuration indicates a type of each multicarrier symbol within a slot configuration period, and a type of each multicarrier symbol in the first symbol set is determined according to a length of the slot configuration period and a type of each multicarrier symbol within a slot configuration period.

In one subembodiment of the above embodiment, the slot configuration period comprises a slot.

In one subembodiment of the above embodiment, the slot configuration period comprises at least one slot.

In one subembodiment of the above embodiment, the slot configuration period comprises at least one multicarrier symbol.

In one subembodiment of the above embodiment, a first multicarrier symbol and a second multicarrier symbol are respectively a multicarrier symbol with a same position in two slot configuration periods, and types of the first multicarrier symbol and the second multicarrier symbol are the same.

In one subembodiment of the above embodiment, a first multicarrier symbol and a second multicarrier symbol are respectively an i-th multicarrier symbol within two slot configuration periods, types of the first multicarrier symbol and the second multicarrier symbol are the same, i being a positive integer not greater than a number of multicarrier symbol(s) comprised within the slot configuration period.

In one embodiment, the first TDD configuration indicates a type of each multicarrier symbol within a slot configuration period, and a type of each multicarrier symbol in each slot is determined according to a length of the slot configuration period and a type of each multicarrier symbol within a slot configuration period.

In one embodiment, the first TDD configuration indicates a type of each multicarrier symbol within a slot configuration period, and a type of each multicarrier symbol in the first symbol set is determined according to a type of each multicarrier symbol within the slot configuration period and a location of the first symbol set within the slot configuration period.

In one subembodiment of the above embodiment, a given multicarrier symbol is any multicarrier symbol in the first symbol set, the given multicarrier symbol is a j-th multicarrier symbol within the slot configuration period, and a type of the given multicarrier symbol is a type of the j-th multicarrier symbol within the slot configuration period, j being a positive integer not greater than a number of multicarrier symbol(s) comprised in the slot configuration period.

In one embodiment, the second TDD configuration is a TDD configuration.

In one embodiment, the second TDD configuration is a slot format.

In one embodiment, the second TDD configuration is semi-statically configured.

In one embodiment, the second TDD configuration is a configuration for a type of a multicarrier symbol in TDD system.

In one embodiment, the second TDD configuration is used to indicate a type of each multicarrier symbol in the first symbol set.

In one embodiment, the second TDD configuration explicitly indicates a type of each multicarrier symbol in the first symbol set.

In one embodiment, the second TDD configuration implicitly indicates a type of each multicarrier symbol in the first symbol set.

In one embodiment, the second TDD configuration indicates a type of each multicarrier symbol within a slot configuration period, and a type of each multicarrier symbol in the first symbol set is determined according to a length of the slot configuration period and a type of each multicarrier symbol within a slot configuration period.

In one subembodiment of the above embodiment, the slot configuration period comprises a slot.

In one subembodiment of the above embodiment, the slot configuration period comprises at least one slot.

In one subembodiment of the above embodiment, the slot configuration period comprises at least one multicarrier symbol.

In one subembodiment of the above embodiment, a third multicarrier symbol and a fourth multicarrier symbol are respectively a multicarrier symbol with a same position within two slot configuration periods, and types of the third multicarrier symbol and the fourth multicarrier symbol are the same.

In one subembodiment of the above embodiment, a third multicarrier symbol and a fourth multicarrier symbol are respectively an i-th multicarrier symbols within two slot configuration periods, types of the third multicarrier symbol and the fourth multicarrier symbol are the same, i being a positive integer not greater than a number of multicarrier symbol(s) comprised in the slot configuration period.

In one embodiment, the second TDD configuration indicates a type of each multicarrier symbol within a slot configuration period, and a type of each multicarrier symbol in each slot is determined according to a length of the slot configuration period and a type of each multicarrier symbol within a slot configuration period.

In one embodiment, the second TDD configuration indicates a type of each multicarrier symbol within a slot configuration period, and a type of each multicarrier symbol in the first symbol set is determined according to a type of each multicarrier symbol within the slot configuration period and a position of the first symbol set within the slot configuration period.

In one subembodiment of the above embodiment, a given multicarrier symbol is any multicarrier symbol in the first symbol set, the given multicarrier symbol is a j-th multicarrier symbol within the slot configuration period, and a type of the given multicarrier symbol is a type of the j-th multicarrier symbol within the slot configuration period, j being a positive integer not greater than a number of multicarrier symbol(s) comprised within the slot configuration period.

In one embodiment, the second TDD configuration is different from the first TDD configuration.

In one embodiment, the second TDD configuration and the first TDD configuration are independently configured.

In one embodiment, the second TDD configuration and the first TDD configuration are respectively configured by two higher-layer information.

In one embodiment, the second TDD configuration is predefined.

In one embodiment, the second TDD configuration is pre-configured.

Embodiment 9

Figure 9:
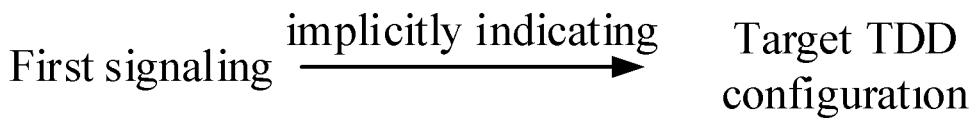
FIG. 9 illustrates a schematic diagram of determining a target TDD configuration according to another embodiment of the present disclosure.

Embodiment 9 illustrates a schematic diagram of determining a target TDD configuration according to another embodiment of the present disclosure, as shown in FIG. 9.

In embodiment 9, only when the first signaling in the present disclosure is a DCI signaling used for uplink grant, the first signaling implicitly indicates the target TDD configuration.

In one embodiment, when the first signaling is a DCI signaling used for downlink grant, the operating action is receiving and the target TDD configuration is fixed to be the first TDD configuration.

Embodiment 10

Figure 10:
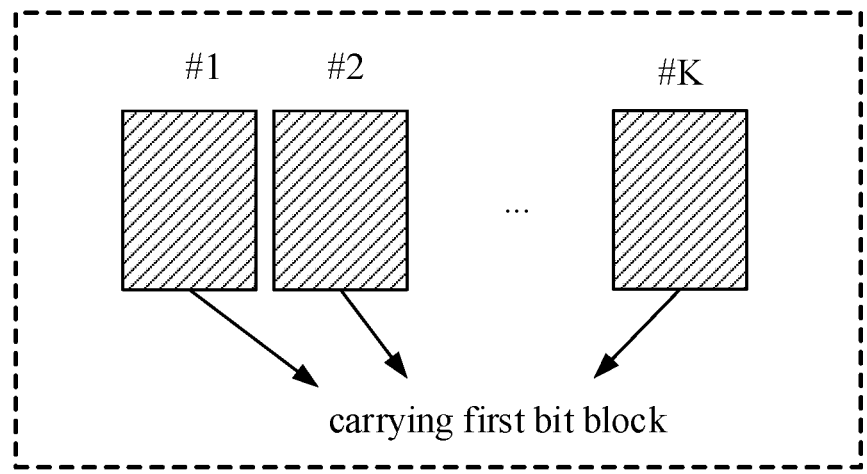
FIG. 10 illustrates a schematic diagram of a relation between a type of a first signaling and a first radio signal according to one embodiment of the present disclosure.

Embodiment 10 illustrates a schematic diagram of a relation between a type of a first signaling and a first radio signal according to one embodiment of the present disclosure, as shown in FIG. 10.

In embodiment 10, when the type of the first signaling comprises the second type in the present disclosure, the first radio signal comprises K sub-signals, and each of the K sub-signals carries a first bit block; K is a positive integer greater than 1, and the first bit block comprises at least one bit.

In one embodiment, the first bit block comprises a transport block (TB).

In one embodiment, the first bit block comprises at least one TB.

In one embodiment, the K subsignals are respectively K repetitions of the first bit block.

In one embodiment, a given subsignal is any of the K subsignals, and the first bit block sequentially goes through CRC Insertion, Channel Coding, Rate Matching, Scrambling, Modulation, Layer Mapping, Precoding, Mapping to Resource Element, OFDM Baseband Signal Generation and Modulation and Upconversion to obtain the given subsignal.

In one embodiment, a given subsignal is any of the K subsignals, and the first bit block sequentially goes through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, Modulation and Upconversion to obtain the given subsignal.

In one embodiment, a given subsignal is any of the K subsignals, the first bit block sequentially goes through CRC Insertion, Segmentation, code-block level CRC Insertion, Channel Coding, Rate Matching, Concatenation, Scrambling, Modulation, Layer Mapping, Precoding, Mapping to Resource Element, OFDM Baseband Signal Generation and Modulation and Upconversion to obtain the given subsignal.

In one embodiment, the first signaling indicates K0, K0 is a positive integer, and K is a positive integer not less than K0.

In one subembodiment of the above embodiment, K0 is greater than 1.

In one subembodiment of the above embodiment, K0 is equal to 1.

In one subembodiment of the above embodiment, K0 is equal to K.

In one subembodiment of the above embodiment, K0 is less than K.

In one subembodiment of the above embodiment, K0 is a nominal number of repetitions, and K is a number of actual repetitions.

In one embodiment, there exist two of the K subsignals belonging to a same slot.

In one embodiment, there exist two subsignals in the K subsignals having different positions in slots to which they belong.

In one embodiment, there exist RVs of two of the K subsignals being different.

In one embodiment, the K subsignals correspond to a same HARQ process number.

Embodiment 11

Figure 11:
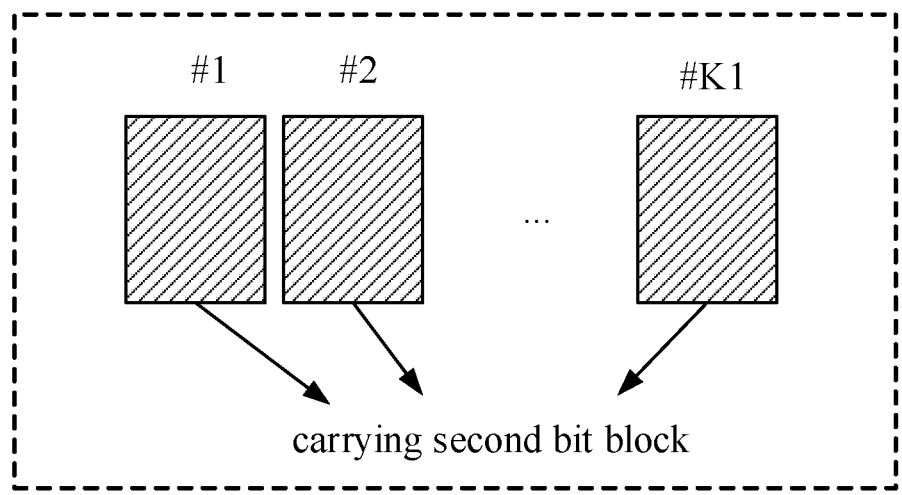
FIG. 11 illustrates a schematic diagram of a relation between a type of a first signaling and a first radio signal according to another embodiment of the present disclosure.

Embodiment 11 illustrates a schematic diagram of a relation between a type of a first signaling and a first radio signal according to another embodiment of the present disclosure, as shown in FIG. 11.

In embodiment 11, when the type of the first signaling comprises the first type in the present disclosure, the first radio signal comprises K1 subsignal(s), and each of the K1 subsignal(s) carries a second bit block; K1 is a positive integer, and the second bit block comprises at least one bit.

In one embodiment, K1 is equal to 1.

In one embodiment, K1 is greater than 1.

In one embodiment, K1 is equal to 1, and the K1 subsignal is a single transmission of the second bit block.

In one embodiment, K1 is greater than 1, and the K1 subsignals are respectively K1 repetitions of the second bit block.

In one embodiment, the second bit block comprises a TB.

In one embodiment, the second bit block comprises at least one TB.

In one embodiment, K1 is equal to 1, and the K1 subsignal is a transmission of the second bit block.

In one embodiment, K1 is greater than 1, and the K1 subsignals are respectively K1 repetitions of the second bit block.

In one embodiment, a given subsignal is any of the K sub signals, and the second bit block sequentially goes through CRC Insertion, Channel Coding, Rate Matching, Scrambling, Modulation, Layer Mapping, Precoding, Mapping to Resource Element, OFDM Baseband Signal Generation and Modulation and Upconversion to obtain the given subsignal.

In one embodiment, a given subsignal is any of the K subsignals, and the second bit block sequentially goes through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion to obtain the given subsignal.

In one embodiment, a given subsignal is any of the K1 subsignal(s), the second bit block sequentially goes through CRC Insertion, Segmentation, code-block level CRC Insertion, Channel Coding, Rate Matching, Concatenation, Scrambling, Modulation, Layer Mapping, Precoding, Mapping to Resource Element, OFDM Baseband Signal Generation, Modulation and Upconversion to obtain the given subsignal.

In one embodiment, the first signaling indicates K1.

In one subembodiment of the above embodiment, K1 is greater than 1.

In one subembodiment of the above embodiment, K1 is equal to 1.

In one subembodiment of the above embodiment, K1 is a number of actual repetitions.

In one embodiment, K1 is greater than 1, and any two of the K1 subsignals respectively belong to different slots.

In one embodiment, K1 is greater than 1, positions of any two of the K1 subsignals in slots to which they respectively belong are the same.

In one embodiment, K1 is greater than 1, and there exist RVs of two of the K subsignals being different.

In one embodiment, K1 is greater than 1, and the K1 subsignals correspond to a same HARQ process number.

Embodiment 12

Figure 12:
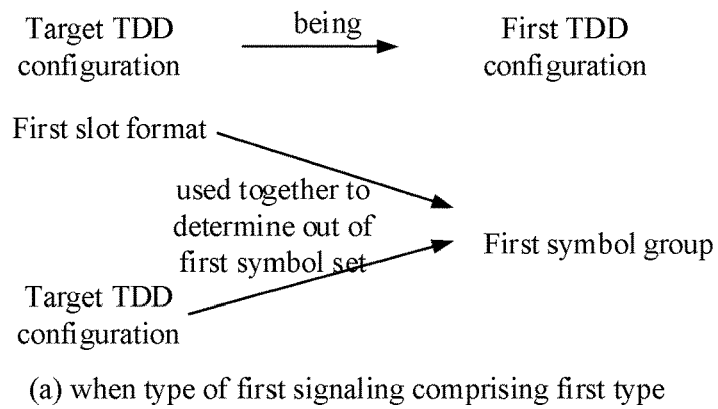
FIG. 12 illustrates a schematic diagram of relations among a first type, a second type and a first symbol group according to one embodiment of the present disclosure.
Figure 12:
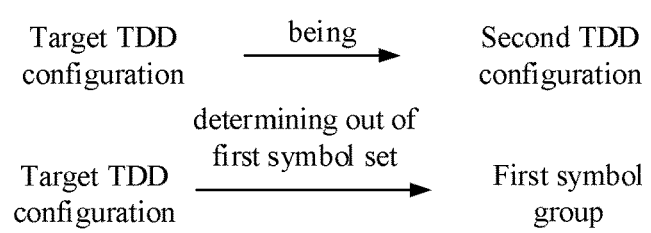

Embodiment 12 illustrates a schematic diagram of relations among a first type, a second type and a first symbol group according to one embodiment of the present disclosure, as shown in FIG. 12.

In embodiment 12, when the type of the first signaling in the present disclosure comprises the first type, the target TDD configuration in the present disclosure is the first TDD configuration in the present disclosure, and the first slot format in the present disclosure and the target TDD configuration are used together to determine the first symbol group out of the first symbol set in the present disclosure; when the type of the first signaling comprises the second type, the target TDD configuration is the second TDD configuration in the present disclosure, only the target TDD configuration in the first slot format and the target TDD configuration is used to determine the first symbol group out of the first symbol set.

Embodiment 13

Figure 13:
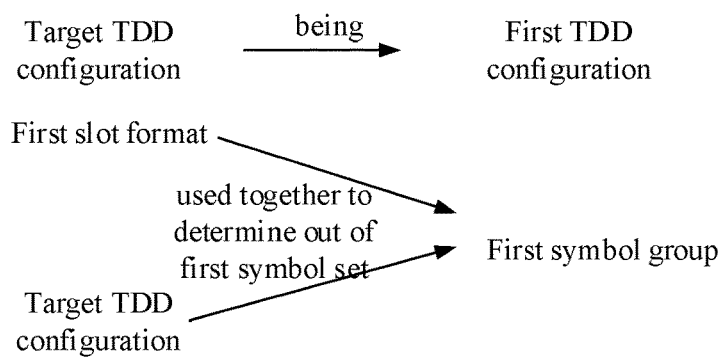
FIG. 13 illustrates a schematic diagram of relations among a first type, a second type and a first symbol group according to another embodiment of the present disclosure.
Figure 13:
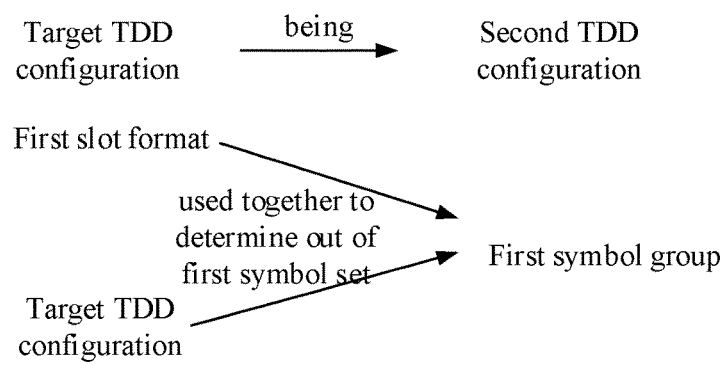

Embodiment 13 illustrates a schematic diagram of relations among a first type, a second type and a first symbol group according to another embodiment of the present disclosure, as shown in FIG. 13.

In embodiment 13, when the type of the first signaling in the present disclosure comprises the first type, the target TDD configuration in the present disclosure is the first TDD configuration in the present disclosure, and the first slot format in the present disclosure and the target TDD configuration are used together to determine the first symbol group out of the first symbol set in the present disclosure; when the type of the first signaling comprises the second type, the target TDD configuration is the second TDD configuration in the present disclosure, the first slot format and the target TDD configuration are used together to determine the first symbol group out of the first symbol set.

Embodiment 14

Figure 14:
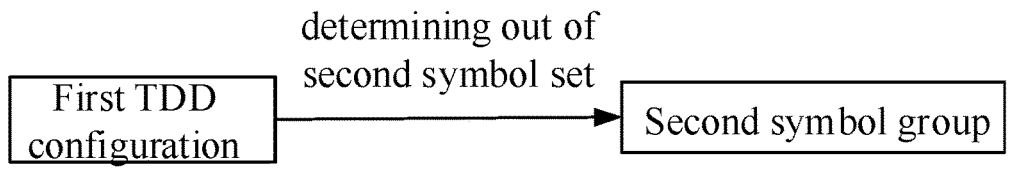
FIG. 14 illustrates a schematic diagram of determining a second symbol group according to one embodiment of the present disclosure.

Embodiment 14 illustrates a schematic diagram of determining a second symbol group according to one embodiment of the present disclosure, as shown in FIG. 14.

In embodiment 14, whether the type of the first signaling in the present disclosure comprises the first type or the second type in the present disclosure, only the first TDD configuration in the first TDD configuration and the second TDD configuration in the present disclosure is used to determine the second symbol group out of the second symbol set in the present disclosure.

In one embodiment, the second symbol group is the second symbol set.

In one embodiment, there exists a multicarrier symbol in the second symbol set not belonging to the second symbol group.

In one embodiment, a given symbol is a multicarrier symbol in the second symbol set; when the first TDD configuration indicates that a type of the given symbol is UL, the given symbol does not belong to the second symbol group.

In one embodiment, a given symbol is a multicarrier symbol in the second symbol set; when the first TDD configuration indicates that a type of the given symbol is DL, the given symbol belongs to the second symbol group.

In one embodiment, a given symbol is a multicarrier symbol in the second symbol set; when the first TDD configuration indicates that a type of the given symbol is Flexible, the given symbol belongs to the second symbol group.

In one embodiment, a given symbol is a multicarrier symbol in the second symbol set; when the first TDD configuration indicates that a type of the given symbol is Flexible, the given symbol does not belong to the second symbol group.

In one embodiment, a given symbol is a multicarrier symbol in the second symbol set; when the first TDD configuration indicates that a type of the given symbol is Flexible, whether the given symbol belongs to the second symbol group is associated with DCI format 2_0.

In one subembodiment of the above embodiment, whether the given symbol belongs to the second symbol group is associated with a type of the given symbol indicated by DCI format 2_0.

In one subembodiment of the above embodiment, when and only when an SFI-index field value in DCI format 2_0 indicates that the type of the given symbol is DL, the given symbol belongs to the second symbol group.

In one subembodiment of the above embodiment, when an SFI-index field value in DCI format 2_0 indicates that the type of the given symbol is UL, the given symbol does not belong to the second symbol group.

In one subembodiment of the above embodiment, when an SFI-index field value in DCI format 2_0 indicates that the type of the given symbol is Flexible, the given symbol does not belong to the second symbol group.

In one subembodiment of the above embodiment, when no SFI-index field value in DCI format 2_0 is detected to indicate that the type of the given symbol is UL or Flexible, and when no DCI signaling is detected to indicate that the given symbol is used for uplink transmission, the given symbol belongs to the second symbol group.

Embodiment 15

Figure 15:
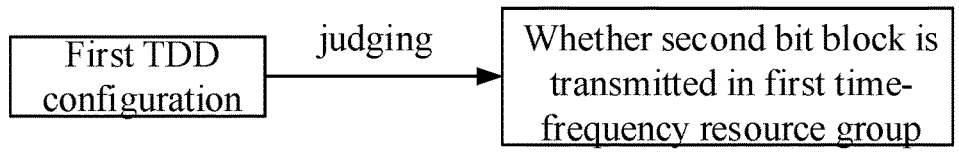
FIG. 15 illustrates a schematic diagram of judging whether a second bit block is transmitted in a first time-frequency resource group according to one embodiment of the present disclosure.

Embodiment 15 illustrates a schematic diagram of judging whether a second bit block is transmitted in a first time-frequency resource group according to one embodiment of the present disclosure, as shown in FIG. 15.

In embodiment 15, whether the type of the first signaling in the present disclosure comprises the first type or the second type in the present disclosure, only the first TDD configuration in the first TDD configuration and the second TDD configuration in the present disclosure is used for the behavior of judging whether a second bit block is transmitted in a first time-frequency resource group.

In one embodiment, when the first TDD configuration indicates that a type of a multicarrier symbol comprised in the first time-frequency resource group is DL, a transmission of the second bit block in the first time-frequency resource group is dropped.

In one embodiment, when the first TDD configuration indicates that a type of a multicarrier symbol comprised in the first time-frequency resource group is DL or Flexible, a transmission of the second bit block in the first time-frequency resource group is dropped.

In one embodiment, when the first TDD configuration indicates that a type of a multicarrier symbol comprised in the first time-frequency resource group is DL, a transmission of the second bit block in the first time-frequency resource group is dropped.

In one embodiment, when the first TDD configuration indicates that a type of a multicarrier symbol comprised in the first time-frequency resource group is DL or Flexible, a transmission of the second bit block in the first time-frequency resource group is dropped.

In one embodiment, when the first TDD configuration indicates that a type of a multicarrier symbol comprised in the first time-frequency resource group is UL, the second bit block is transmitted in the first time-frequency resource group.

In one embodiment, when the first TDD configuration indicates that a type of a multicarrier symbol comprised in the first time-frequency resource group is UL or Flexible, the second bit block is transmitted in the first time-frequency resource group Embodiment 16

Figure 16:
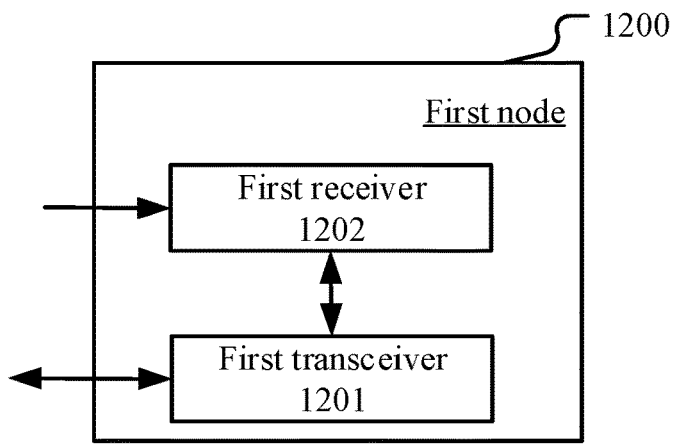
FIG. 16 illustrates a structure block diagram of a processing device in a first node according to one embodiment of the present disclosure.

Embodiment 16 illustrates a structure block diagram of a processing device in a first node, as shown in FIG. 16. In FIG. 16, a processing device 1200 of a first node comprises a first transceiver 1201 and a first receiver 1202.

In one embodiment, the first node 1200 is a UE.

In one embodiment, the first node 1200 is a relay node.

In one embodiment, the first node 1200 is a base station.

In one embodiment, the first node 1200 is a vehicle-mounted communication device.

In one embodiment, the first node 1200 is a UE that supports V2X communications.

In one embodiment, the first node 1200 is a relay node that supports V2X communications.

In one embodiment, the first transceiver 1201 comprises at least one of the antenna 452, the transmitter/receiver 454, the multi-antenna transmitting processor 457, the multi-antenna receiving processor 458, the transmitting processor 468, the receiving processor 456, the controller/processor 459, the memory 460 or the data source 467 in FIG. 4 of the present disclosure.

In one embodiment, the first transceiver 1201 comprises at least the first seven of the antenna 452, the transmitter/receiver 454, the multi-antenna transmitting processor 457, the multi-antenna receiving processor 458, the transmitting processor 468, the receiving processor 456, the controller/processor 459, the memory 460 or the data source 467 in FIG. 4 of the present disclosure.

In one embodiment, the first transceiver 1201 comprises at least the first six of the antenna 452, the transmitter/receiver 454, the multi-antenna transmitting processor 457, the multi-antenna receiving processor 458, the transmitting processor 468, the receiving processor 456, the controller/processor 459, the memory 460 or the data source 467 in FIG. 4 of the present disclosure.

In one embodiment, the first transceiver 1201 comprises at least the first four of the antenna 452, the transmitter/receiver 454, the multi-antenna transmitting processor 457, the multi-antenna receiving processor 458, the transmitting processor 468, the receiving processor 456, the controller/processor 459, the memory 460 or the data source 467 in FIG. 4 of the present disclosure.

In one embodiment, the first transceiver 1201 comprises at least first five of the antenna 452, the transmitter/receiver 454, the multi-antenna transmitting processor 457, the transmitting processor 468, the controller/processor 459, the multi-antenna receiving processor 458, the receiving processor 456, the memory 460 or the data source 467 in FIG. 4 of the present disclosure.

In one embodiment, the first transceiver 1201 comprises at least first four of the antenna 452, the transmitter/receiver 454, the multi-antenna transmitting processor 457, the transmitting processor 468, the controller/processor 459, the multi-antenna receiving processor 458, the receiving processor 456, the memory 460 or the data source 467 in FIG. 4 of the present disclosure.

In one embodiment, the first transceiver 1201 comprises at least first three of the antenna 452, the transmitter/receiver 454, the multi-antenna transmitting processor 457, the transmitting processor 468, the controller/processor 459, the multi-antenna receiving processor 458, the receiving processor 456, the memory 460 or the data source 467 in FIG. 4 of the present disclosure.

In one embodiment, the first receiver 1202 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1202 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1202 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1202 comprises at least the first three of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1202 comprises at least the first two of the antenna 452, the receiver 454, the multi-antenna receiving processor 458, the receiving processor 456, the controller/processor 459, the memory 460 or the data source 467 in FIG. 4 of the present disclosure.

The first receiver 1202 receives a first signaling, the first signaling is used to indicate a first symbol set; and the first transceiver 1201 operates a first radio signal in only a first symbol group in the first symbol set;

In Embodiment 16, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

In one embodiment, the first receiver 1202 also receives first information; herein, the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

In one embodiment, when the type of the first signaling comprises the second type, the first radio signal comprises K sub-signals, and each of the K sub-signals carries a first bit block; K is a positive integer greater than 1, and the first bit block comprises at least one bit.

In one embodiment, only when the first signaling is a DCI signaling used for uplink grant, the first signaling implicitly indicates the target TDD configuration.

In one embodiment, the first receiver 1202 also receives a second signaling, the second signaling is used to indicate a first slot format; herein, the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set, or the first slot format and the target TDD configuration are used together to determine the first symbol group out of the first symbol set.

In one embodiment, the first receiver 1202 also receives third information, the third information is used to indicate a second symbol set; and monitors the first signaling in only a second symbol group in the second symbol set; herein, no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set.

In one embodiment, the first transceiver 1201 also judges whether a second bit block is transmitted in a first time-frequency resource group; if yes, transmits the second bit block in the first time-frequency resource group; if no, drops transmitting the second bit block in the first time-frequency resource group; herein, the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is transmitted in a first time-frequency resource group.

Embodiment 17

Figure 17:
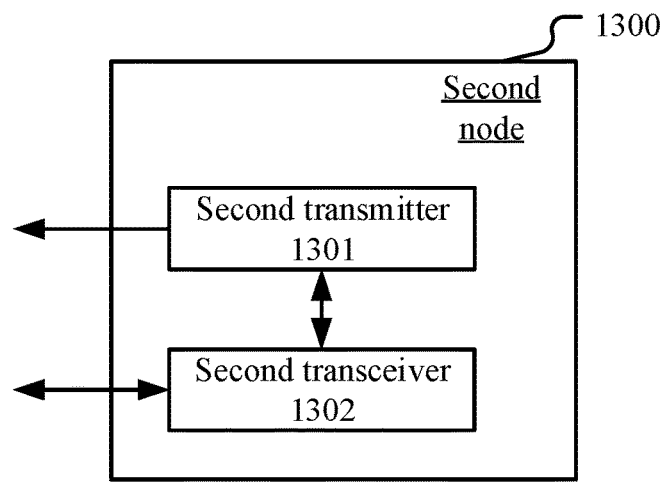
FIG. 17 illustrates a structure block diagram of a processing device in second node according to one embodiment of the present disclosure.

Embodiment 17 illustrates a structure block diagram of a processing device in a second node, as shown in FIG. 17. In FIG. 17, a processing device 1300 of a second node comprises a second transmitter 1301 and a second transceiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 or the memory 476 in FIG. 4 of the present disclosure.

In one embodiment, the second transceiver 1302 comprises at least one of the antenna 420, the transmitter/receiver 418, the multi-antenna transmitting processor 471, the multi-antenna receiving processor 472, the transmitting processor 416, the receiving processor 470, the controller/processor 475 or the memory 476 in FIG. 4 of the present disclosure.

In one embodiment, the second transceiver 1302 comprises at least first seven of the antenna 420, the transmitter/receiver 418, the multi-antenna transmitting processor 471, the multi-antenna receiving processor 472, the transmitting processor 416, the receiving processor 470, the controller/processor 475 or the memory 476 in FIG. 4 of the present disclosure.

In one embodiment, the second transceiver 1302 comprises at least first six of the antenna 420, the transmitter/receiver 418, the multi-antenna transmitting processor 471, the multi-antenna receiving processor 472, the transmitting processor 416, the receiving processor 470, the controller/processor 475 or the memory 476 in FIG. 4 of the present disclosure.

In one embodiment, the second transceiver 1302 comprises at least first four of the antenna 420, the transmitter/receiver 418, the multi-antenna transmitting processor 471, the multi-antenna receiving processor 472, the transmitting processor 416, the receiving processor 470, the controller/processor 475 or the memory 476 in FIG. 4 of the present disclosure.

In one embodiment, the second transceiver 1302 comprises at least first five of the antenna 420, the transmitter/receiver 418, the multi-antenna receiving processor 472, the receiving processor 470, the controller/processor 475, the multi-antenna transmitting processor 471, the transmitting processor 416 or the memory 476 in FIG. 4 of the present disclosure.

In one embodiment, the second transceiver 1302 comprises at least first four of the antenna 420, the transmitter/receiver 418, the multi-antenna receiving processor 472, the receiving processor 470, the controller/processor 475, the multi-antenna transmitting processor 471, the transmitting processor 416 or the memory 476 in FIG. 4 of the present disclosure.

In one embodiment, the second transceiver 1302 comprises at least first three of the antenna 420, the transmitter/receiver 418, the multi-antenna receiving processor 472, the receiving processor 470, the controller/processor 475, the multi-antenna transmitting processor 471, the transmitting processor 416 or the memory 476 in FIG. 4 of the present disclosure.

The second transmitter 1301 transmits a first signaling, the first signaling is used to indicate a first symbol set; and the second transceiver 1302 executes a first radio signal in only a first symbol group in the first symbol set;

In Embodiment 17, the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target TDD configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

In one embodiment, the second transmitter 1301 also transmits first information; herein, the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

In one embodiment, when the type of the first signaling comprises the second type, the first radio signal comprises K sub-signals, and each of the K sub-signals carries a first bit block; K is a positive integer greater than 1, and the first bit block comprises at least one bit.

In one embodiment, only when the first signaling is a DCI signaling used for uplink grant, the first signaling implicitly indicates the target TDD configuration.

In one embodiment, the second transmitter 1301 also transmits a second signaling, and the second signaling is used to indicate a first slot format; herein, the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set, or the first slot format and the target TDD configuration are used together to determine the first symbol group out of the first symbol set.

In one embodiment, the second transmitter 1301 also transmits third information, the third information is used to determine a second symbol set; herein, the first signaling is transmitted in only a second symbol group in the second symbol set; no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set.

In one embodiment, the second transceiver 1302 also judges whether a second bit block is received in a first time-frequency resource group; if yes, receives the second bit block in the first time-frequency resource group; if no, drops receiving the second bit block in the first time-frequency resource group; herein, the executing action is transmitting; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is received in a first time-frequency resource group.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, the first signaling being used to indicate a first symbol set; and
a first transceiver, operating a first radio signal in only a first symbol group in the first symbol set;
wherein the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target Time Division Duplex (TDD) configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

2. The first node according to claim 1, wherein the first receiver also receives first information; wherein the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

3. The first node according to claim 1, wherein when a type of the first signaling comprises a first type, the first radio signal comprises K1 subsignal(s), each of the K1 subsignal(s) carries a second bit block; K1 is a positive integer, and the second bit block comprises at least one bit; K1 is equal to 1, and the K1 subsignal is a transmission of the second bit block; or, K1 is greater than 1, positions of any two of the K1 subsignals in slots to which they respectively belong are the same;

when the type of the first signaling comprises a second type, the first radio signal comprises K sub-signals, and each of the K sub-signals carries a first bit block; K is a positive integer greater than 1, the first bit block comprises at least one bit; the K subsignals are respectively K repetitions of the first bit block; the first signaling indicates K0, the K0 being a positive integer, and the K0 is a number of nominal repetitions.

4. The first node according to claim 2, wherein the first receiver also receives a second signaling, and the second signaling is used to indicate a first slot format; wherein the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set.

5. The first node according to claim 2, wherein the first receiver also receives third information, and the third information is used to indicate a second symbol set; monitors the first signaling in only a second symbol group in the second symbol set; wherein no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set;

or, the first transceiver also judges whether a second bit block is transmitted in a first time-frequency resource group; if yes, transmits the second bit block in the first time-frequency resource group; if no, drops transmitting the second bit block in the first time-frequency resource group; wherein the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is transmitted in a first time-frequency resource group.

6. A second node for wireless communications, comprising:
a second transmitter, transmitting a first signaling, the first signaling being used to indicate a first symbol set; and
a second transceiver, executing a first radio signal in only a first symbol group in the first symbol set;
wherein the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target Time Division Duplex (TDD) configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

7. The second node according to claim 6, wherein the second transmitter also transmits first information; wherein the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

8. The second node according to claim 6, wherein when a type of the first signaling comprises a first type, the first radio signal comprises K1 subsignal(s), each of the K1 subsignal(s) carries a second bit block; K1 is a positive integer, and the second bit block comprises at least one bit; K1 is equal to 1, and the K1 subsignal is a transmission of the second bit block; or, K1 is greater than 1, positions of any two of the K1 subsignals in slots to which they respectively belong are the same;

when the type of the first signaling comprises a second type, the first radio signal comprises K sub-signals, and each of the K sub-signals carries a first bit block; K is a positive integer greater than 1, the first bit block comprises at least one bit; the K subsignals are respectively K repetitions of the first bit block; the first signaling indicates K0, the K0 being a positive integer, and the K0 is a number of nominal repetitions.

9. The second node according to claim 7, wherein the second transmitter also transmits a second signaling, the second signaling is used to indicate a first slot format;

wherein the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set.

10. The second node according to claim 7, wherein the second transmitter also transmits third information, the third information is used to determine a second symbol set; wherein the first signaling is transmitted in only a second symbol group in the second symbol set; no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set;

or, the second transceiver also judges whether a second bit block is received in a first time-frequency resource group; if yes, receives the second bit block in the first time-frequency resource group; if no, drops receiving the second bit block in the first time-frequency resource group; wherein the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is received in a first time-frequency resource group.

11. A method in a first node for wireless communications, comprising:
receiving a first signaling, the first signaling being used to indicate a first symbol set; and
operating a first radio signal in only a first symbol group in the first symbol set;
wherein the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target Time Division Duplex (TDD) configuration is used to determine a type of each multicarrier symbol in the first symbol set, the target TDD configuration is used to determine the first symbol group out of the first symbol set, and the first signaling implicitly indicates the target TDD configuration; the operating action is transmitting, or the operating action is receiving.

12. The method according to claim 11, comprising:
receiving first information;
wherein the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

13. The method according to claim 11, wherein when a type of the first signaling comprises a first type, the first radio signal comprises K1 subsignal(s), each of the K1 subsignal(s) carries a second bit block; K1 is a positive integer, and the second bit block comprises at least one bit; K1 is equal to 1, and the K1 subsignal is a transmission of the second bit block; or, K1 is greater than 1, positions of any two of the K1 subsignals in slots to which they respectively belong are the same;

when the type of the first signaling comprises a second type, the first radio signal comprises K sub-signals, and each of the K sub-signals carries a first bit block; K is a positive integer greater than 1, the first bit block comprises at least one bit; the K subsignals are respectively K repetitions of the first bit block; the first signaling indicates K0, the K0 being a positive integer, and the K0 is a number of nominal repetitions.

14. The method according to claim 12, comprising:
receiving a second signaling, the second signaling being used to indicate a first slot format;
wherein the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set.

15. The method according to claim 12, comprising:
receiving third information, the third information being used to indicate a second symbol set; and monitoring the first signaling in only a second symbol group in the second symbol set;
wherein no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set;

or, comprising:
judging whether a second bit block is transmitted in a first time-frequency resource group; if yes, transmitting the second bit block in the first time-frequency resource group; if no, dropping transmitting the second bit block in the first time-frequency resource group;
wherein the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is transmitted in a first time-frequency resource group.

16. A method in a second node for wireless communication, comprising:
transmitting a first signaling, the first signaling being used to indicate a first symbol set; and
executing a first radio signal in only a first symbol group in the first symbol set;
wherein the first signaling is used to indicate scheduling information of the first radio signal; the first symbol set comprises at least one multicarrier symbol, the first symbol group comprises at least one multicarrier symbol, any multicarrier symbol in the first symbol group belongs to the first symbol set, and a number of multicarrier symbol(s) comprised in the first symbol group is not greater than a number of multicarrier symbol(s) comprised in the first symbol set; a target Time Division Duplex (TDD) configuration is used to determine a type of each multicarrier symbol in the first symbol set, the target TDD configuration is used to determine the first symbol group out of the first symbol set, and the first signaling implicitly indicates the target TDD configuration; the executing action is receiving, or, the executing action is transmitting.

17. The method according to claim 16, comprising:
transmitting first information;
wherein the first information is carried by a higher-layer signaling, and the first information is used to determine a first TDD configuration; when a type of the first signaling comprises a first type, the target TDD configuration is the first TDD configuration; and when the type of the first signaling comprises a second type, the target TDD configuration is a second TDD configuration.

18. The method according to claim 16, wherein when a type of the first signaling comprises a first type, the first radio signal comprises K1 subsignal(s), each of the K1 subsignal(s) carries a second bit block; K1 is a positive integer, and the second bit block comprises at least one bit; K1 is equal to 1, and the K1 subsignal is a transmission of the second bit block; or, K1 is greater than 1, positions of any two of the K1 subsignals in slots to which they respectively belong are the same;
when the type of the first signaling comprises a second type, the first radio signal comprises K sub-signals, and each of the K sub-signals carries a first bit block; K is a positive integer greater than 1, the first bit block comprises at least one bit; the K subsignals are respectively K repetitions of the first bit block; the first signaling indicates K0, the K0 being a positive integer, and the K0 is a number of nominal repetitions.

19. The method according to claim 17, comprising:
transmitting a second signaling, the second signaling being used to indicate a first slot format;
wherein the second signaling is carried by a physical-layer signaling; when the type of the first signaling comprises the first type, the target TDD configuration is the first TDD configuration, the first slot format and the target TDD configuration are used together to determine the first symbol group out of the first symbol set; when the type of the first signaling comprises the second type, the target TDD configuration is the second TDD configuration, only the target TDD configuration in the first slot format and the target TDD configuration is used to determine the first symbol group out of the first symbol set.

20. The method according to claim 17, comprising:
transmitting first information, the first information being used to determine a second symbol set;
wherein the first signaling is transmitted in only a second symbol group in the second symbol set; no matter whether the type of the first signaling comprises the first type or the second type, only the first TDD configuration in the first TDD configuration and the second TDD configuration is used to determine the second symbol group out of the second symbol set; the second symbol set comprises at least one multicarrier symbol, the second symbol group comprises at least one multicarrier symbol, any multicarrier symbol in the second symbol group belongs to the second symbol set, and a number of multicarrier symbol(s) comprised in the second symbol group is not greater than a number of multicarrier symbol(s) comprised in the second symbol set;
or, comprising:
judging whether a second bit block is received in a first time-frequency resource group; if yes, receiving the second bit block in the first time-frequency resource group; if no, dropping receiving the second bit block in the first time-frequency resource group;
wherein the operating action is receiving; the first signaling is used to indicate the first time-frequency resource group, and the second bit block is used to indicate whether the first radio signal is correctly received; no matter whether the type of the first signaling comprises the first type or the second type, only the first TDD configuration in the first TDD configuration and the second TDD configuration is used for the behavior of judging whether a second bit block is received in a first time-frequency resource group.

* * * * *